(12) United States Patent
Kosior et al.

(10) Patent No.: US 11,627,703 B2
(45) Date of Patent: Apr. 18, 2023

(54) PORTABLE GRAIN BIN

(71) Applicants: David William Kosior, Fillmore (CA); Patrick M. Beaujot, Kipling (CA)

(72) Inventors: David William Kosior, Fillmore (CA); Patrick M. Beaujot, Kipling (CA)

(*) Notice: Subject to any disclaimer, the term of this patent is extended or adjusted under 35 U.S.C. 154(b) by 219 days.

(21) Appl. No.: 16/903,755

(22) Filed: Jun. 17, 2020

(65) Prior Publication Data
US 2020/0396903 A1 Dec. 24, 2020

Related U.S. Application Data

(60) Provisional application No. 62/870,510, filed on Jul. 3, 2019, provisional application No. 62/863,100, filed on Jun. 18, 2019.

(51) Int. Cl.
| | |
|---|---|
| *B65D 88/06* | (2006.01) |
| *A01F 25/14* | (2006.01) |
| *B65D 88/52* | (2006.01) |

(52) U.S. Cl.
CPC ............. *A01F 25/14* (2013.01); *B65D 88/52* (2013.01)

(58) Field of Classification Search
CPC ......... A01F 12/60; A01F 25/14; B65D 88/52; B65D 88/005; B65D 21/086

USPC .................................................... 220/8, 4.28
See application file for complete search history.

(56) References Cited

U.S. PATENT DOCUMENTS

| | | | |
|---|---|---|---|
| 4,121,389 A | 10/1978 | Ptaszek | |
| 4,454,807 A | 6/1984 | Wolstenholme | |
| 5,556,338 A | 9/1996 | Covington | |

FOREIGN PATENT DOCUMENTS

| | | | | |
|---|---|---|---|---|
| CA | 3040314 | * | 5/2018 | ............. B65D 88/16 |
| DE | 2929301 | * | 2/1981 | ............. B65D 88/06 |

* cited by examiner

*Primary Examiner* — John K Fristoe, Jr.
*Assistant Examiner* — Elizabeth J Volz
(74) *Attorney, Agent, or Firm* — Bennett Jones LLP

(57) ABSTRACT

An expandable and collapsible grain bin is provided comprising at least two telescoping cylindrical sections adapted to interlock with one another when the grain bin is in an expanded position; a base member attached to the bottom most cylindrical section; and a bin cover for enclosing the grain bin, said bin cover adapted to be in a raised position when the grain bin is in the expanded position and in a lowered position when the grain bin is in a collapsed position.

25 Claims, 27 Drawing Sheets

PORTABLE GRAIN BIN

FIELD OF THE INVENTION

The present invention relates generally to grain bins and more particularly to a portable grain bin which is expandable to hold more grain and collapsible for easy transport.

BACKGROUND OF THE INVENTION

Historically, storage of grain by farmers occurred in large storage bins located on the farmers' properties. However, it has become increasingly more common for family grain farms to expand their operations by renting land for growing grain, which land may be a considerable distance from the base farm. Thus, during harvesting, which is an extremely time sensitive operation, it is impractical to truck the grain back to home base. In addition, because the land is rented, it is not practical to put expensive permanent grain bins on the land.

One option is to use grain bags, which are made of plastic, and which provide a low cost temporary storage of large volumes of grain. However, these plastic bags can only be used once and have become more unpopular due to environmental concerns. In addition, wildlife can poke holes into the grain bags during storage, causing grain to leak out and water to seep in. In addition, time and specialized equipment is needed to empty the grain bags and there is often more loss of grain when cleaning up the grain bags.

There is a need in the industry for a reusable grain bin that can be transported from field to field for reuse.

SUMMARY OF THE INVENTION

The present invention relates to a portable grain bin which is expandable to hold more grain and collapsible for easy transport.

In one aspect, an expandable and collapsible grain bin is provided, comprising:
at least two telescoping cylindrical sections adapted to interlock with one another when the grain bin is in an expanded position;
a base member attached to the bottom most cylindrical section; and
a bin cover for enclosing the grain bin, said bin cover adapted to be in a raised position when the grain bin is in the expanded position and in a lowered position when the grain bin is in a collapsed position.

In one embodiment, the grain bin comprises two cylindrical sections, a top section and a bottom section, the top section having an inner diameter that is larger than the outer diameter of the bottom section. In this embodiment, the base member has an outer support that is larger than the outer diameter of the top section so that when the grain bin is in the collapsed position the top section can rest on the outer support.

In another embodiment, the grain bin comprises two cylindrical sections, a top section and a bottom section, the top section having an outer diameter that is smaller than the inner diameter of the bottom section.

In one embodiment, the at least two telescoping cylindrical sections interlock with one another by means of an interlocking system comprising a steel ring on the inside of the bottom of an upper section if the upper section is the larger diameter section or the outside of the bottom of an upper section if the upper section is the smaller diameter section and a plurality of support members at or near the top of a lower section located directly below the upper section, which are adapted so that the steal ring can rest on the support members. In one embodiment, the interlocking system further comprises a tarp wrapped around the support members to provide a waterproof seal between each section. In this embodiment, there is a curved member connecting the support members that can expand and contract to create a continuous seal between the support members when in the expanded position. This curved member is also wrapped with a tarp to provide the seal when the bin is in the expanded position. In one embodiment, the curved member can be a plurality of curved metal sheets connecting the support members, whereby the metal sheets provide a seal when the bin is in the expanded position.

In one embodiment, the grain bin comprises a non-flexible cylindrical bottom section (e.g., steel) and a flexible upper section, whereby the flexible upper section collapses into the non-flexible lower section when in the collapsed position. In one embodiment, the flexible upper section comprises a flexible tarp-like material having steel rings, or the like, woven into the flexible material, said steel rings having a smaller outer diameter than the inner diameter of the bottom section. This allows the upper section to collapse into the bottom section along with the bin cover when the grain bin is in the collapsible position ready for transport.

BRIEF DESCRIPTION OF THE DRAWINGS

The invention will now be described by way of exemplary embodiments with reference to the accompanying simplified, diagrammatic, not-to-scale drawings.

DETAILED DESCRIPTION OF PREFERRED EMBODIMENTS

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practised without these specific details.

Figure 1:
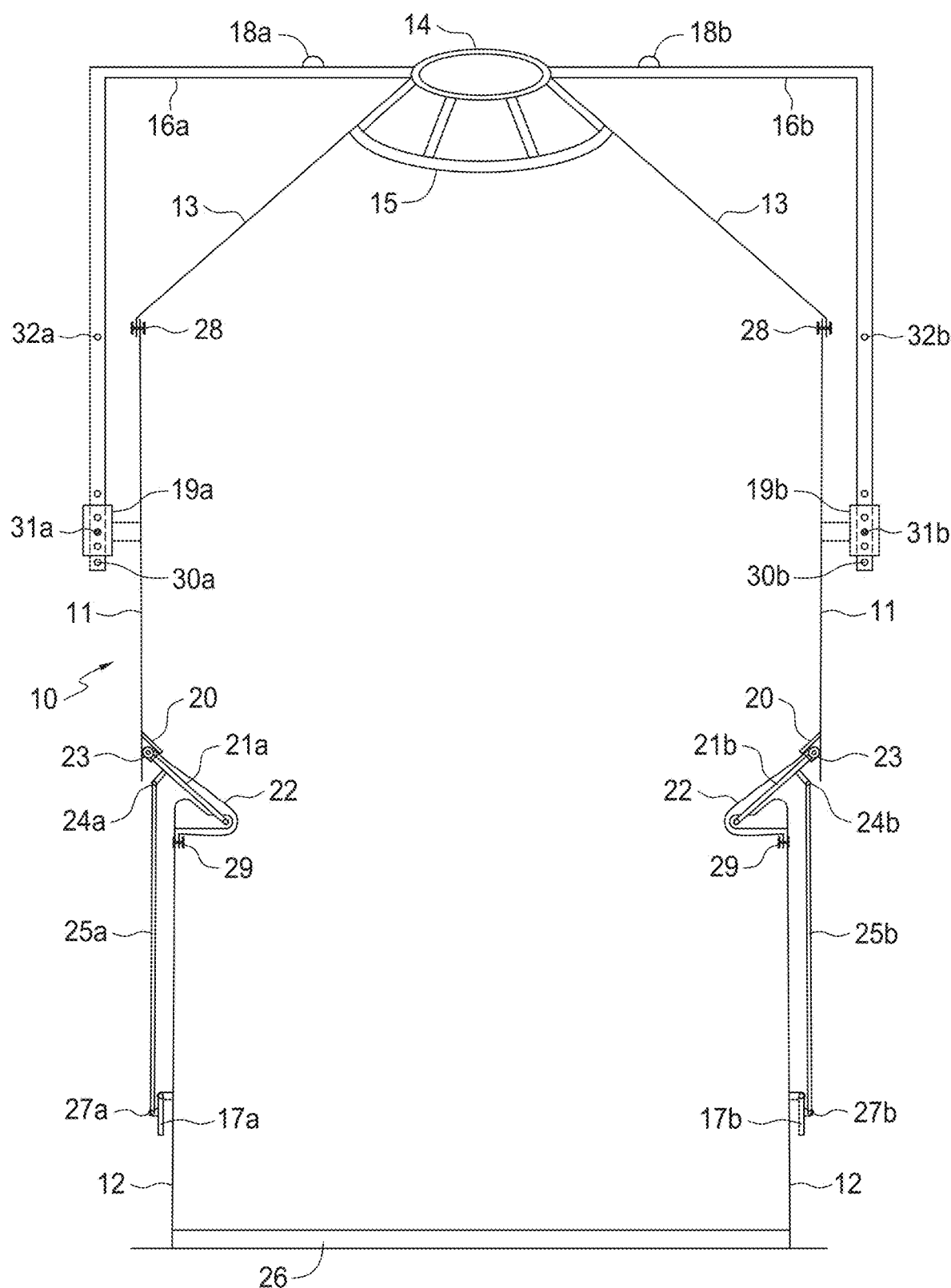
FIG. 1 is a cross-sectional view of an embodiment of the expandable and collapsible grain bin when in a fully expanded position ready to be filled with grain (working position).

With reference first to FIG. 1, an embodiment of an expandable and collapsible grain bin of the present invention is shown in the fully expanded position, ready to be fill with grain. In this embodiment, portable grain bin 10 comprises two telescoping cylindrical sections, upper bin section 11 and lower bin section 12. In one embodiment, sections 11, 12 are made of steel or galvanized steel. Affixed to the bottom of lower bin section 12 is steel floor 26. In this embodiment, upper bin section 11 has an inner diameter that is larger than the outer diameter of lower bin section 12 such that upper bin section 11 can slide over lower bin section 12 when in the collapsed position and rest on steel floor 26, which has an outer dimension that is larger than the outer diameter of upper bin section 11.

Portable grain bin 10 further comprises collapsible bin cover 9 comprising a tent-shaped tarp 13. It is understood that tarp 13 could also be domed-shaped. The wider, bottom of the tent-shaped tarp 13 is attached to the top outside edge of upper bin section 11 with fasteners 28 and the narrower, top of tarp 13 is attached to steel ring 14. A tarp support cage 15 is attached to steel ring 14 for supporting the upper portion of tarp 13. Bin cover 9 is shown in the expanded position in FIG. 1 and is held in the expanded position by at least two support polls 16a and 16b, each attached to ring 14 at one end and to holders 19a and 19b, respectively, at the other end. Support polls 16a and 16b are pinned into holders 19a and 19b via pins 31a and 31b, respectively. In one embodiment, both support poles 16a, 16b and holders 19a, 19b have a plurality of holes 30a, 30b so that the height of tarp 13 can be adjusted according to a specific use and maintain tarp tension. Support polls 16a, 16b further comprise at least one crane hook receiver, 18a, 18b, respectively. Crane hooks (not shown) can hook into receivers 18a, 18b to lift and lower both the tarp 13 and upper bin section 11 with a standard bin crane or the like. Pipes 23 give upper bin section 11 something strong to rest on and allow curved rods 33 to expand and retract when moving from sealed to transport position. The curved rods 33 are necessary to provide something for the seal tarp 22 to wrap around and provide a continuous seal between pipes 23. There must be one continuous seal around the full diameter of the bin so the rods 33 fill the gaps between the pipes 23. Rods 33 are adapted to tuck under steel ring 20.

Figure 5A:
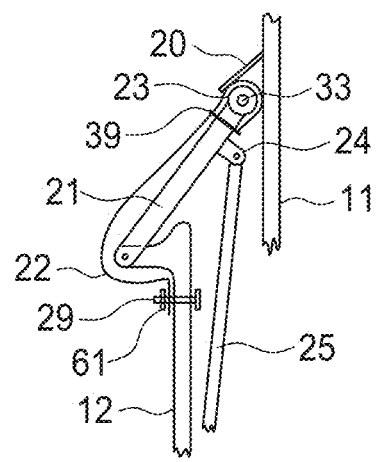
FIG. 5A is an enlargement of the interlocking device of FIGS. 4A and 4B in the extended position to support the upper bin section and sealing the joint between the upper bin and the lower bin.
Figure 5B:
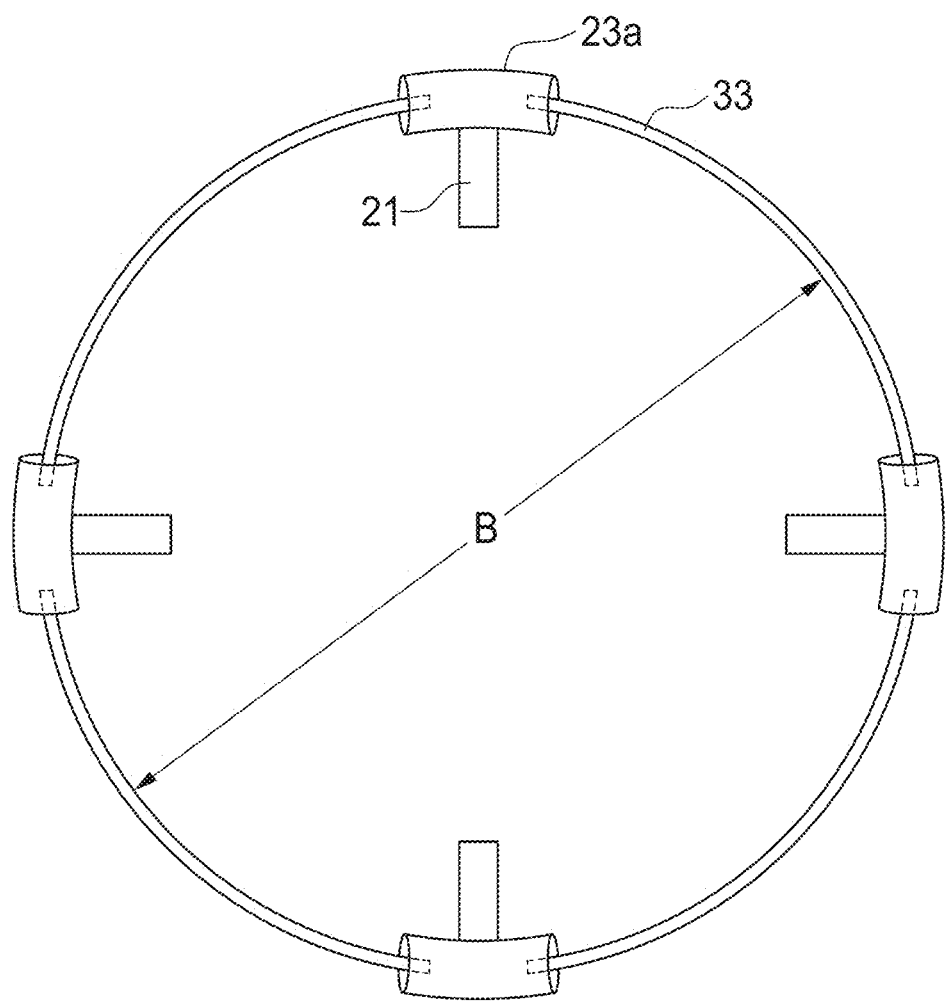
FIG. 5B is a top view of the interlocking device of FIGS. 4A and 4B in the extended or sealed position.

Upper bin section 11 is interlocked with lower bin section 12 via heavy steel ring 20 attached to the lower portion of bin section 11. Steel ring 20 is attached to the inner circumference of upper bin section 11 in such a way that it is at an inward downward angle for receiving a plurality of support members, which in this embodiment are support and sealing arms 21, positioned on the inner periphery of lower bin section 12. Only two such support and sealing arms, 21a and 21b, are shown in FIG. 1 but it is understood that there can be more than two support and sealing arms. FIGS. 5A and 5B show a close up side view and aerial view, respectively, of the interlocking system of FIG. 1, i.e., when the grain bin is in the extended position. As shown in FIG. 5A, each support and sealing arm 21 further comprises curved support pipe 23 and curved rods 33 (shown more clearly in FIG. 5B).

Support and sealing arm 21 is covered with sealing tarp 22, which tarp 22 is held in place by snaps or rivets 39. Sealing tarp 22 is attached to the inner wall of upper bin section 12 with fasteners 29 (shown more clearly in FIGS. 6A-6C). The sealing tarp 22 is sandwiched between steel strap 61 and the inner wall of lower bin section 12 and tightened with fasteners 29 that go through steel strap 61, tarp 22 and the inner wall of lower bin section 12. As a result, grain cannot leak out of the interlocking connection between lower bin section 12 and upper bin section 11. The interlocking system further comprises positioning rod 25a/25b. The upper end of positioning rod 25a/25b is attached to arm 21a/21b, respectively, at pivot point 24a/24b, respectively, and the lower end of rod 25a/25b is attached to leavers 17a/17b at pivot point 27a/27b, respectively, to move and hold arm 21a/21b in desired position. When lowering outer bin section 11 onto ring 20, arm 21a/21b can be held in position with a strap or the like (not shown).

Figure 2:
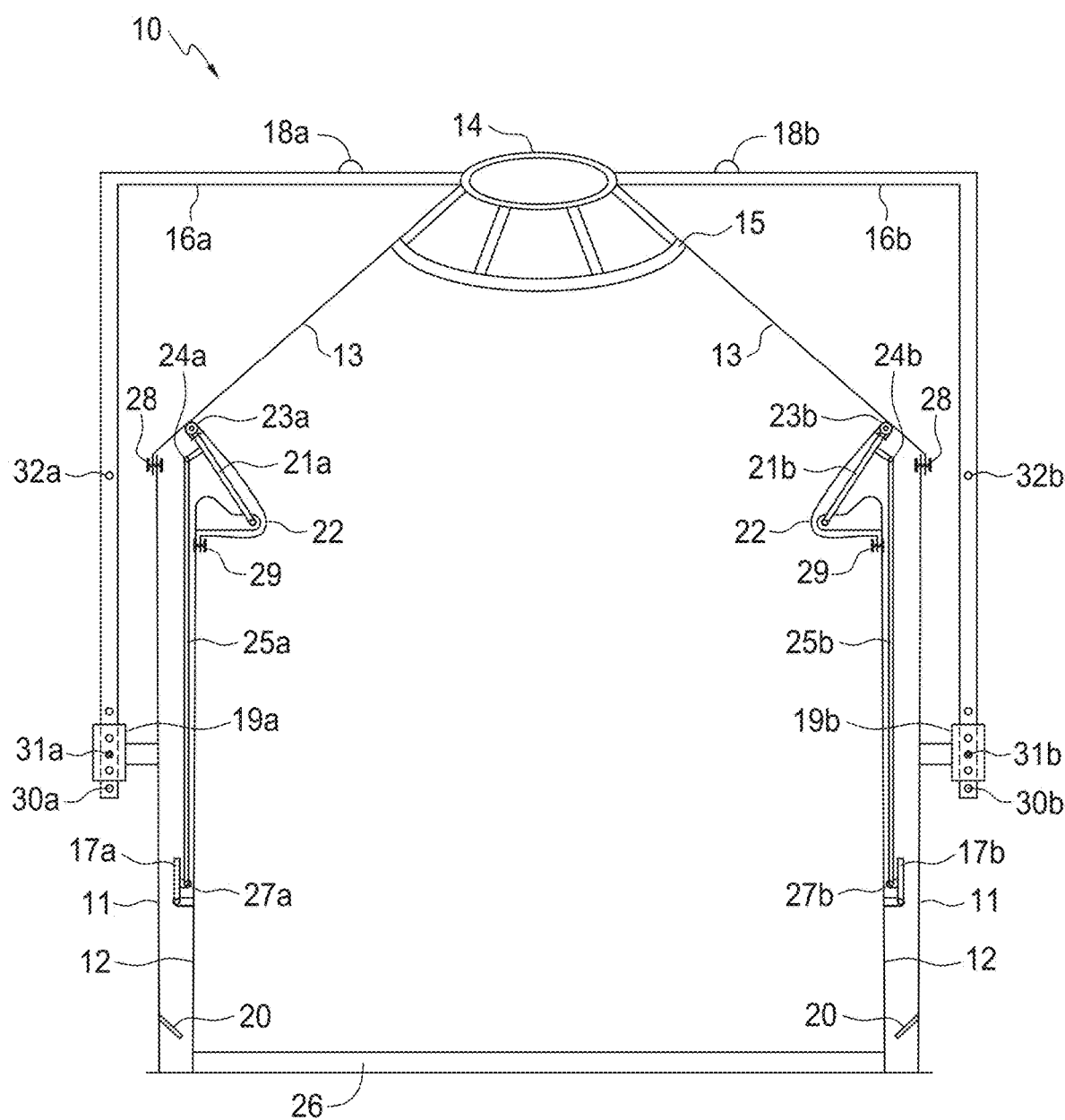
FIG. 2 is a cross-sectional view of the expandable and collapsible grain bin of FIG. 1 when in a partially collapsed position.
Figure 4A:
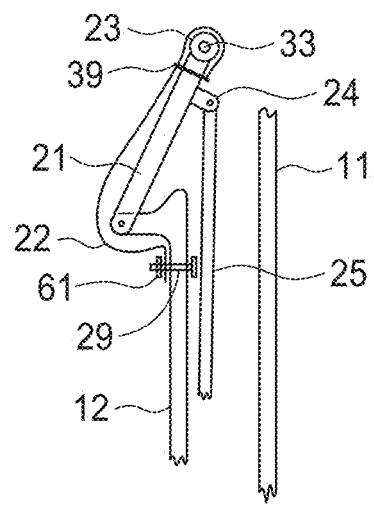
FIG. 4A is an enlargement of an embodiment of an interlocking system in the retracted or non-sealed position. The interlocking system acts as both a support mechanism for supporting the upper bin sections and as a seal mechanism to form a seal between the upper and lower bin sections.
Figure 4B:
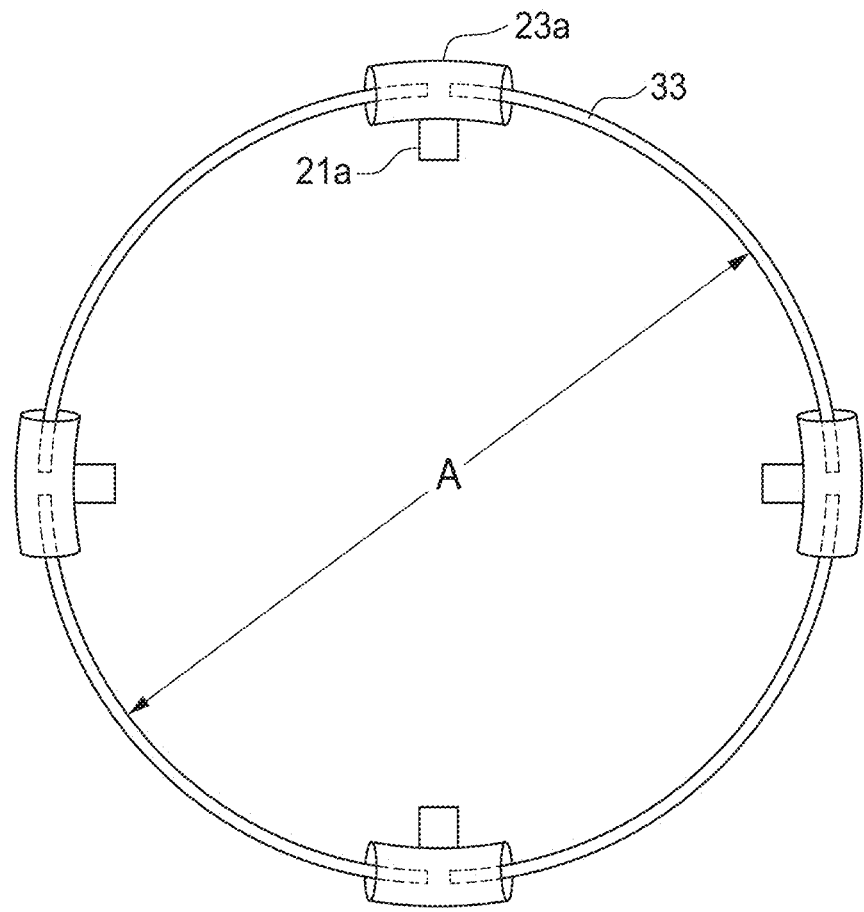
FIG. 4B is a top view of the interlocking system of FIG. 4A in the retracted or non-sealed position.

The first step in collapsing the extended portable grain bin 10 of FIG. 1 is shown in FIG. 2 and FIGS. 4A and 4B. In particular, to lower the bin 10 into transport position, a standard bin crane or the like can be used. In particular, a bin crane is attached to crane hook receivers 18a, 18b, to take pressure off the support and sealing arms 21. Once bin 10 is high enough that support and sealing arms 21 are clear of ring 20, the support and sealing arms 21 can be pushed into the retracted position via positioning rods 25 by moving leaver 17 into the upward position as shown in FIG. 2. Leaver 17 can again be held in position by a strap or the like (not shown). The bin crane can be lowered until upper bin section 11 rests on the steel base 26. The device could be stored in this position with the roof up as shown in FIG. 2.

Figure 3A:
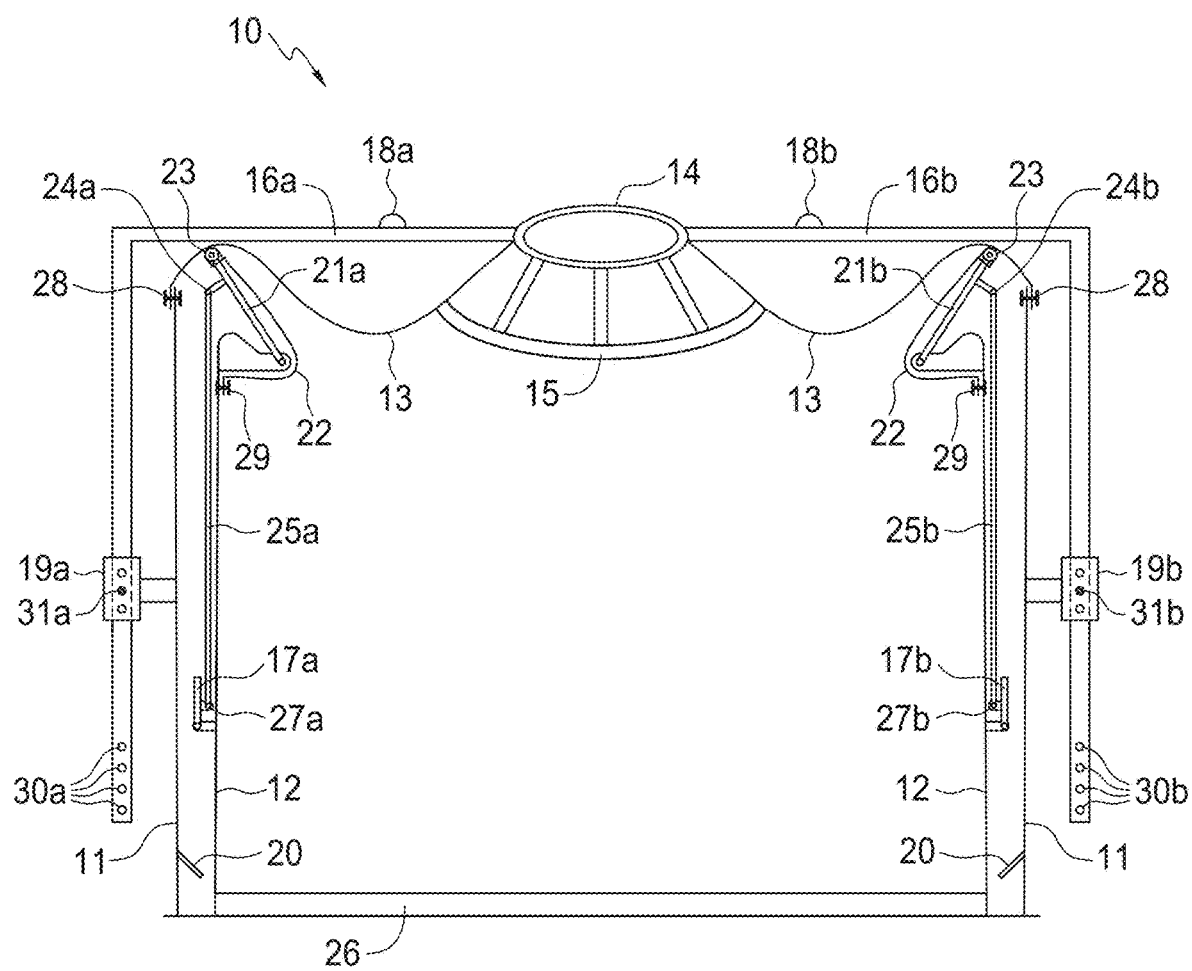
FIG. 3A is a cross-sectional view of the expandable and collapsible grain bin of FIG. 1 when in a fully collapsed position (transport position).
Figure 3B:
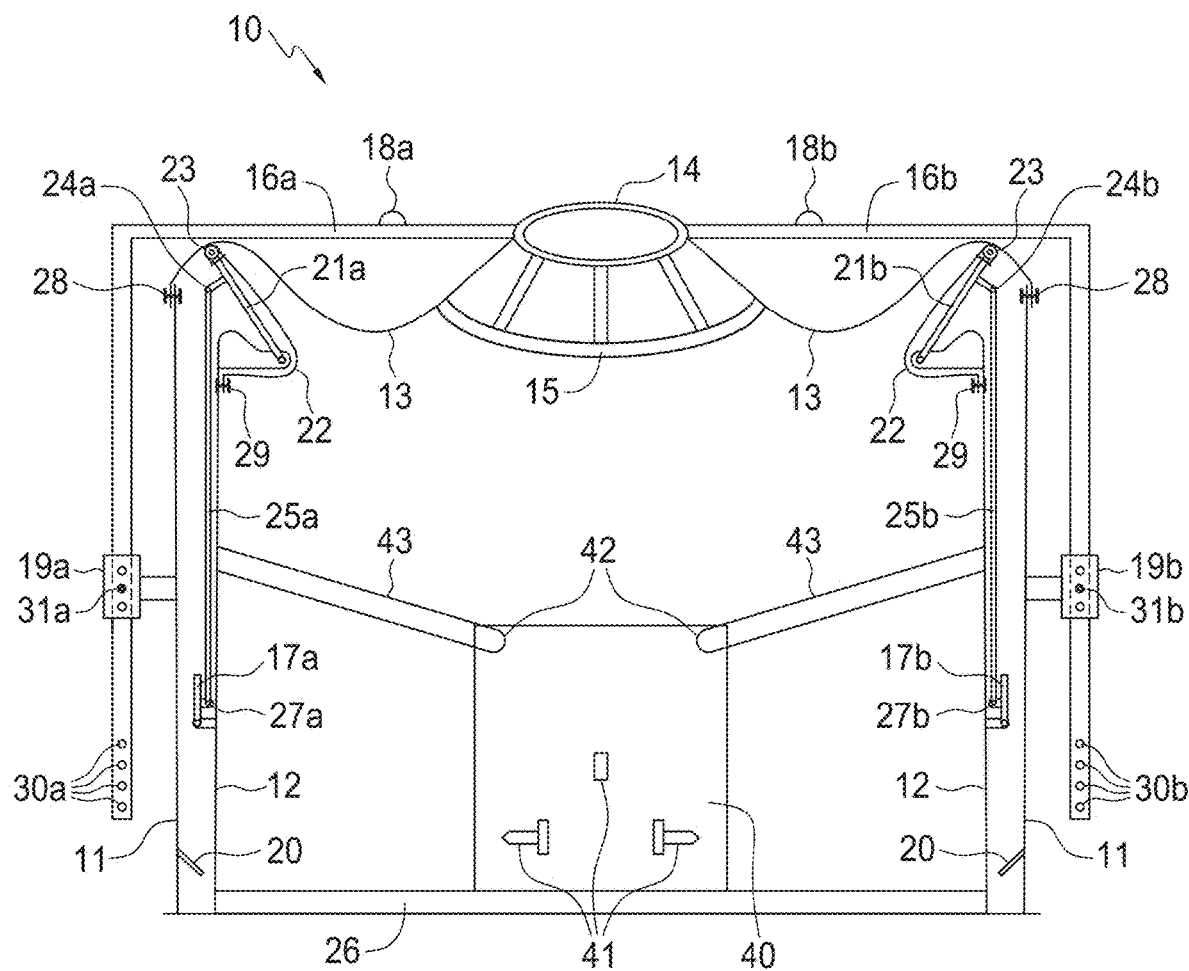
FIG. 3B is a cross-sectional view of the grain bin of FIG. 3A showing a steel lifting plate attached to the steel floor which is strong enough to carry the bin when lifted by standard 3 point hitch.

To get ready for transport, with the bin crane still attached to crane hook receivers 18, the next step is to remove pins 31 from roof support poles 16 and holder 19. The roof support structure is further lowered until holes 32a, 32b are aligned with a hole in roof holders 19, as shown in FIG. 3A. A steel lifting plate 40 is attached to the steel floor 26 which is strong enough to carry the bin when lifted by standard 3 point hitch, pins 41 or the like, as shown in FIG. 3B. At the top of lifting plate 40 are two heavy strap hooks 42 so strap 43 can be wrapped around the upper bin section 11 of bin 10. It is understood, however, that either lifting plate 40 or steel floor 26 of lower bin section 12 could also support transport wheels and a standard hitch for transportation when grain bin in the collapsed position. In the alternative, collapsed grain bin can be transferred to a low trailer using a skid for transport.

FIG. 4A shows a close-up of the interlocking system in the retracted position, which shows the tarp 22 wrapped around curved pipe 23 and curved rod 33 held into place by snap or rivet fasteners 39. Tarp 22 is held into place at the bottom via steel plate 61 and fasteners 29. It can be seen in FIG. 4B that curved rods 33 are pulled into a smaller diameter (Diameter A) verses Diameter B shown in FIG. 5B.

Figure 6A:
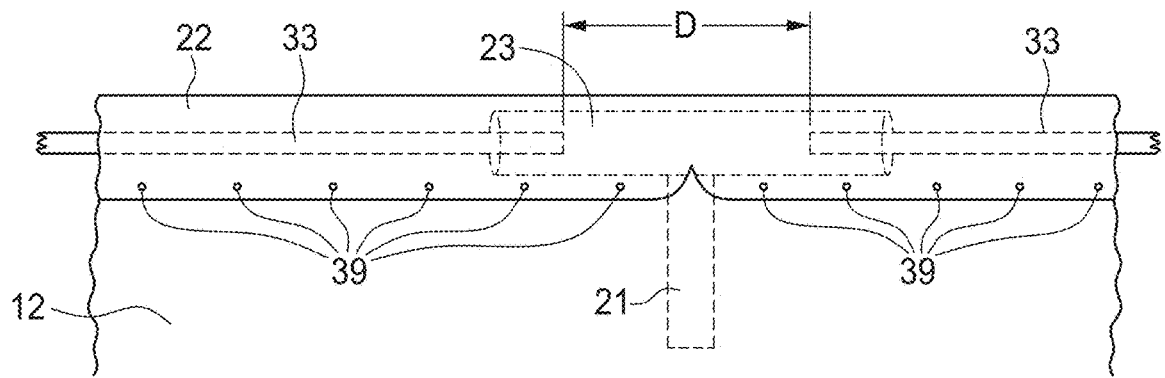
FIG. 6A is a side view of an enlarged portion of the interlocking device of FIG. 5B in the extended or sealed position.
Figure 6B:
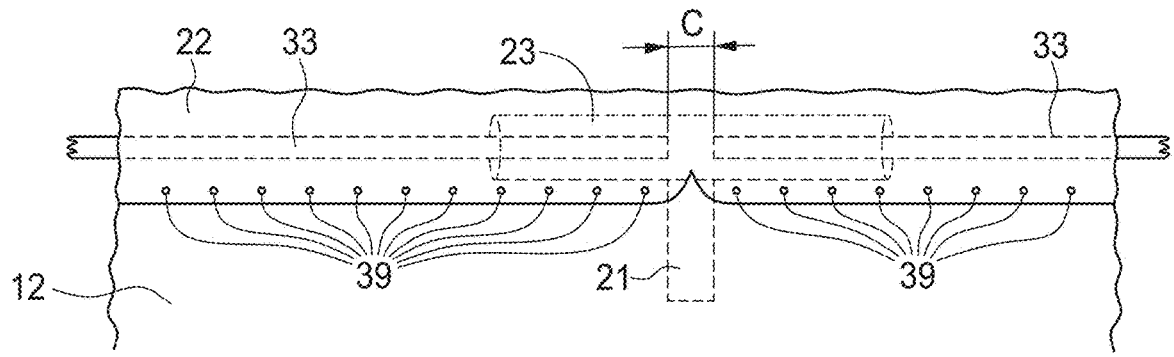
FIG. 6B is a side view of an enlarged portion of the interlocking device of FIG. 4B in the retracted or non-sealed position.
Figure 6C:
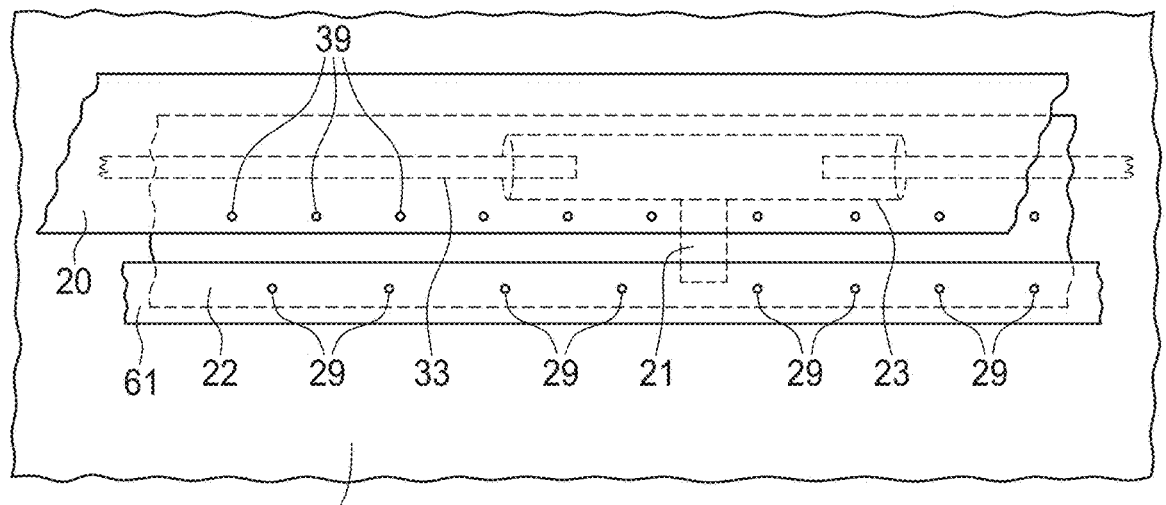
FIG. 6C is an opposite side view to FIG. 6A, viewed from the inside of the grain bin showing the interlocking device of FIG. 5A in the extended or sealed position.

FIG. 6A is a view of the tarp 22 wrapped around curved pipe 23 and curved rod 33 held in place by rivets or snaps fasteners 39. This attachment of tarp 22 keeps it secure but it can be expanded and retracted from Diameter A (FIG. 4B) to Diameter B (FIG. 5B). In FIG. 6B, the tarp 22 is shown with loose or ruffled edges as support and sealing arm 21 is in the retracted position. FIG. 6C shows the tarp 22 from inside the lower bin section 12, whereby the lower end of the tarp 22 is attached by sandwiching it between steel strap 61 and the inner wall of lower bin section 12 and tightened and held in place with fasteners 29.

Figure 7:
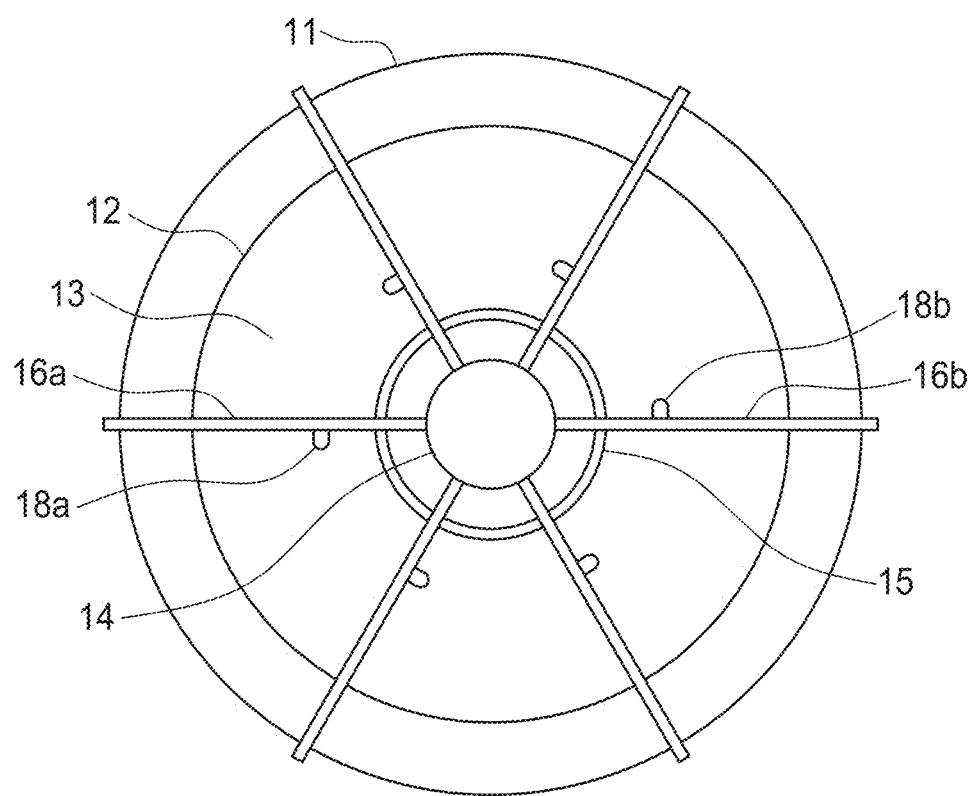
FIG. 7 is a top view of the expandable and collapsible grain bin of FIG. 1 showing the bin cover support members.

FIG. 7 shows a top view of the device disclosing a plurality of bin cover support arms 16 that may be required depending on the diameter of the desired bin. It is understood that a smaller diameter bin will require fewer support arms 16 than a large diameter bin. These arms 16 are used to hold the roof in position, as well as lifting upper bin section 11 from transport to working position. It is anticipated that a minimum of three support arms will be required, depending on the diameter of the bin.

Figure 8A:
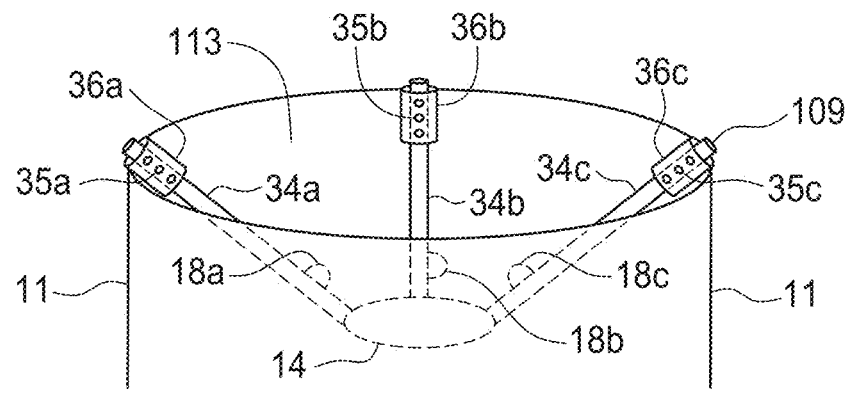
FIG. 8A is a perspective view of another embodiment of a collapsible bin cover useful in the present invention in the lowered or transport position.
Figure 8B:
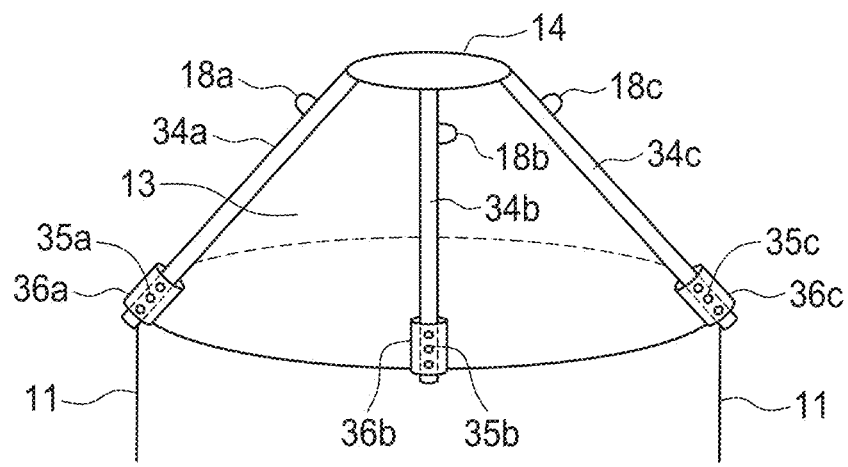
FIG. 8B is a perspective view of the collapsible bin cover of FIG. 8A in the raised or working position.
Figure 8C:
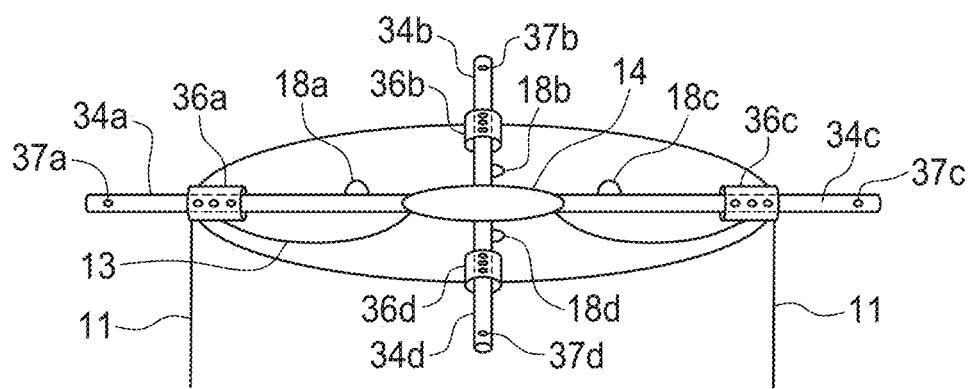
FIG. 8C is a perspective view of the collapsible bin cover of FIG. 8A in a partially retracted position.
Figure 9:
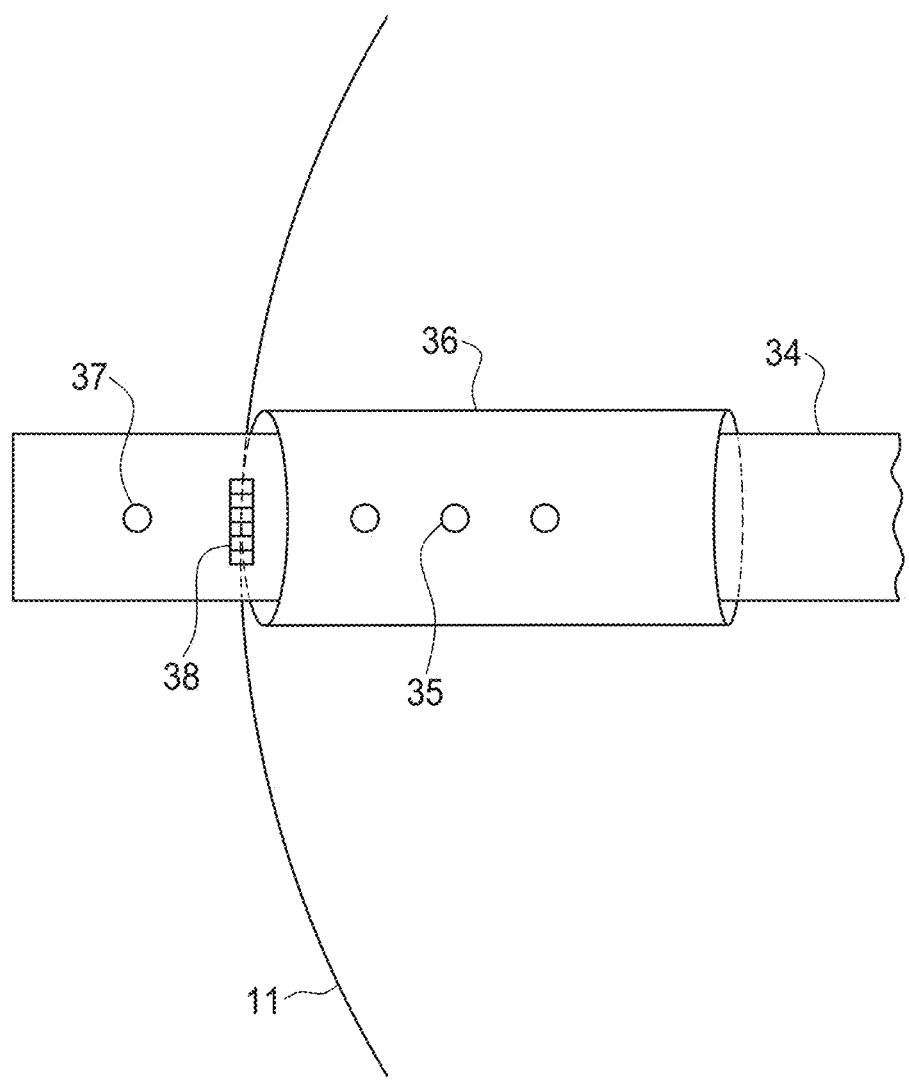
FIG. 9 is an enlarged view of the positioning guide pipe of the collapsible bin cover of FIG. 8C in the partially retracted position.

FIGS. 8A-C show an alternate collapsible bin cover 109 comprising tarp 113 where roof polls 34 lift into position when they are lifted via crane hook receivers 18 and poles 34 are held in position via hinged pole holders 36 and can be adjustably pinned into position with pin holes 35. FIG. 9 shows the hinge connecting pole holders 36 to the top of upper bin section 11 allowing the poles to pivot as well as expand and retract as the roof is lifted and lowered. Similarly, the polls 34 have a hinged connection to ring 14 (not shown).

It is understood that ring 14 is designed to receive a standard bin lid that can be opened or closed for filling and storage (not shown).

Figure 10:
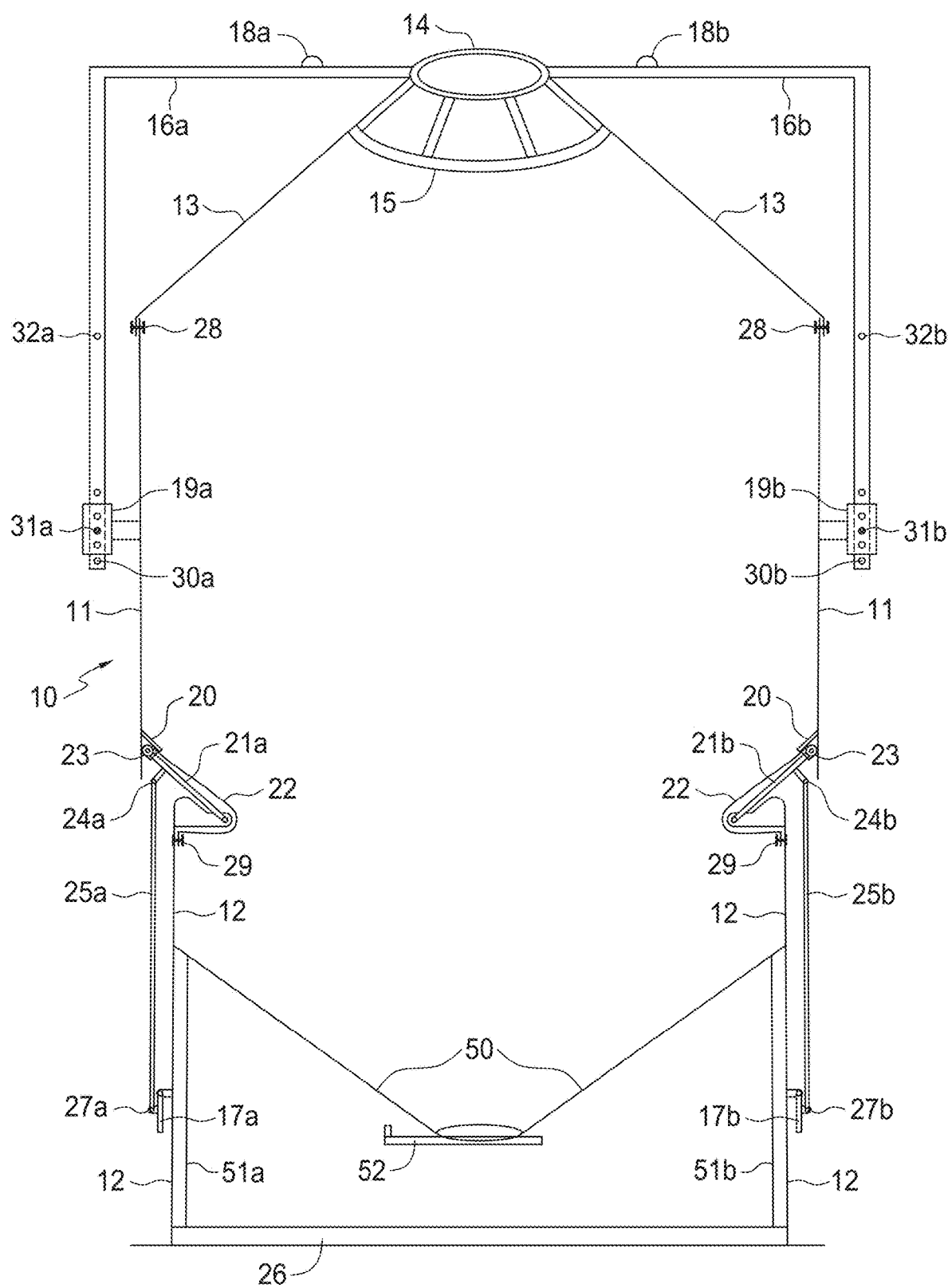
FIG. 10 is cross-sectional view of FIG. 1 with an alternative hopper bottom option.

Some farmers prefer hopper bottom bins for easier cleanout, even though a hopper bottom reduces the capacity of the bin. FIG. 10 shows an alternate construction of lower bin section 12, which has been converted to angled hopper bottom cone 50 having a plurality of support legs 51 (51a, 51b). Standard hopper bottom unload gate 52 can also be used for bin access.

Figure 11:
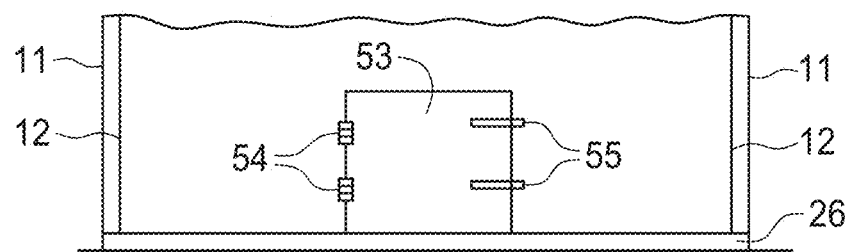
FIGS. 11-13 illustrate access doors to the lower position of the grain bin in the collapsed or storage position.
Figure 12:
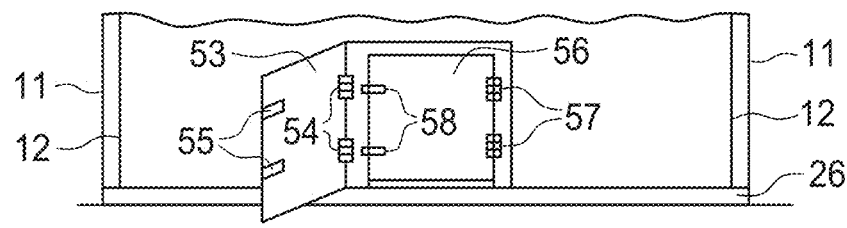
Figure 13:
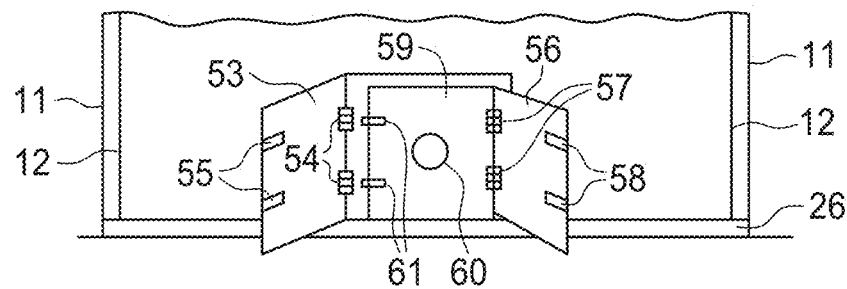

In FIGS. 11-13, lower bin section 12 is provided with a standard bin door 53 that swings out on hinges 54 and is held in the closed position with latches 55. In line with door 53, upper bin section 11 has slightly smaller door 56 with latches 58 and hinges 57, so it also can swing out. Inside is a standard inside bin door 59 with auger hole 60 latches 61 that is removable or swings inward once most of the grain is removed. This allows the bin to be accessed in the transport position as well as in the working position. Other common attachments could be added to lower bin section 12 such as an aeration fan attachment heat and moisture sensors etc.

In one embodiment, holes (not shown) could be drilled in outer edge of steel floor 26 so that screw anchors could be put into the ground to secure bin 10. In addition, straps could be tied to holders 19 at one end and screw anchors into the ground at the other end to secure bin 10.

Figure 14:
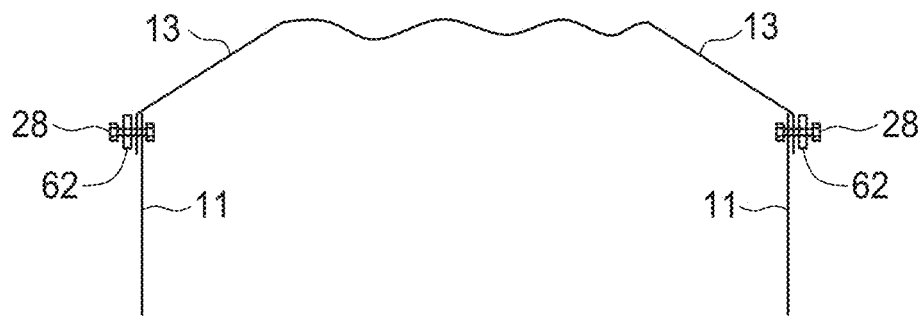
FIG. 14 is a close up cross-section view of the collapsible bin cover attached to the upper outside edge of the uppermost bin section.

FIG. 14 shows a close-up of the attachment of the roof tarp 13 to the top outer edge of upper bin section 11, whereby steel strap 62 sandwiches tarp 13 between it and the outer wall of upper bin section 11 with fasteners 28.

Figure 15:
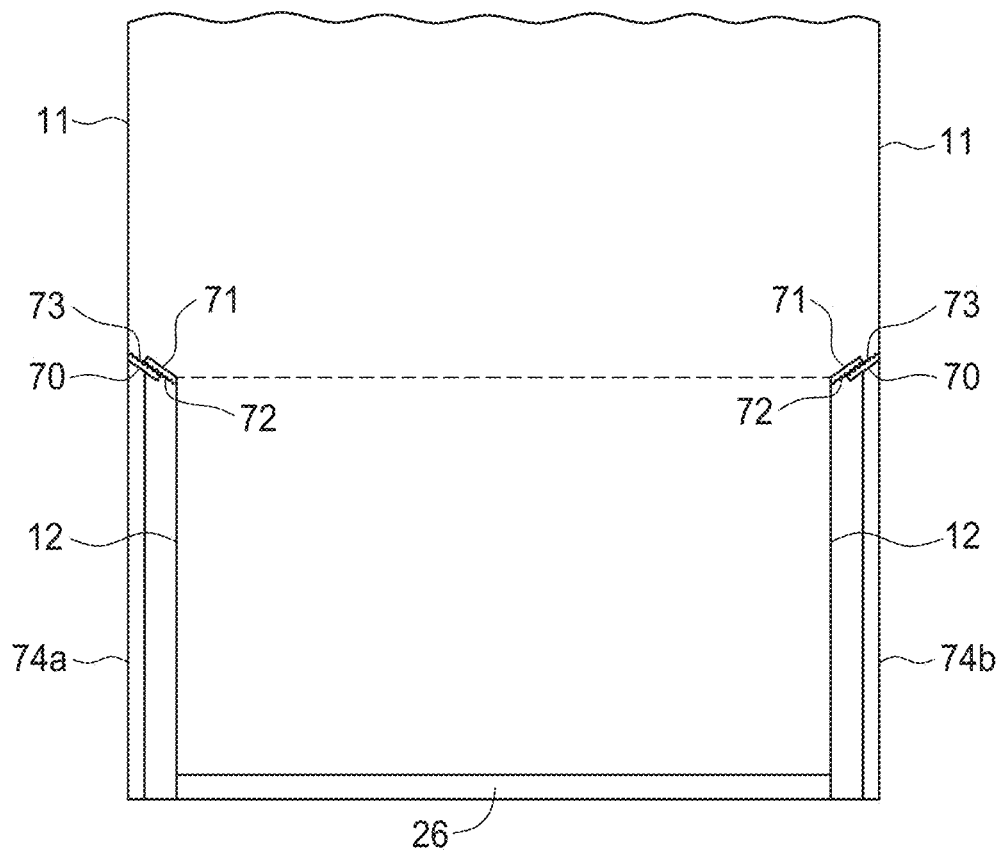
FIG. 15 illustrates another embodiment of an interlocking device useful in the present invention in the extended or sealed position.
Figure 16:
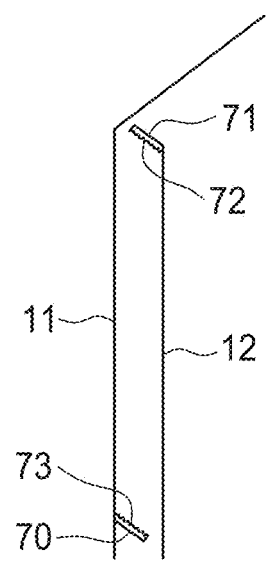
FIG. 16 illustrates the interlocking device of FIG. 15 in the retracted or non-sealed position.

FIG. 15 shows an alternate interlocking system for interlocking lower bin section 12 and upper bin section 11 in the working position. In this embodiment, a first steel ring 70 is attached near the lower part of upper bin section 11 at a downward and inward angle. A second steel ring 71 is attached to the upper outside edge of lower bin section 12. Ring 71 is attached at an upward and outward angle to match ring 70. The upper surface of ring 70 and the lower surface of ring 71 are covered in a rubber sealing material. When upper bin section 11 is lifted into working position, the two rings 70, 71 and the sealing material make contact, effectively sealing the grain in and moisture out. To ensure continuous contact, a plurality of polls 74 (shown as 74a and 74*b*) are placed under steel ring 70. FIG. 16 shows the alternate sealing method of FIG. 15 in the transport or storage position.

Figure 17:
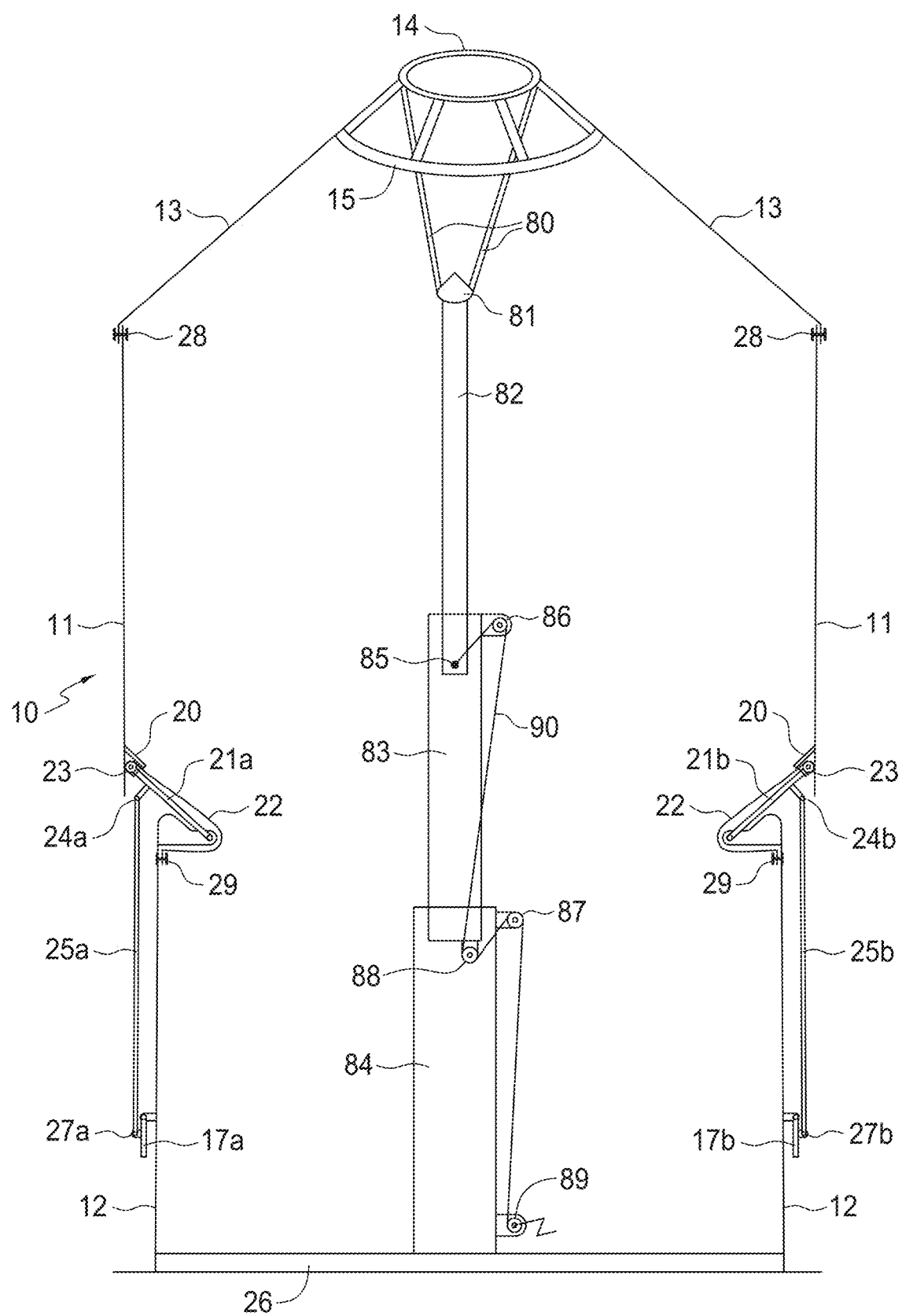
FIGS. 17, 18 and 19 illustrate an alternative internal telescoping lift mechanism in an extended position, a partially retracted position, and a retracted position, respectively.

FIG. 17 shows an alternate internal lifting mechanism. A standard telescoping pole comprising pole sections 82, 83, 84 is fixed to the bottom of lower bin section 11 or to steel base 26, preferably, in the middle of the bin section. The pole can be extended by cranking pulley 89 retracting cable 90 effectively lifting poll sections 82, 83 and 84. Cable 90 is fixed to the pulley on winch 89 at one end and fixed to the lower end of pole section 82 passing through pulleys 87, 88, and 86. FIG. 17 shows the lifting mechanism in the fully extended position. The top of the pole section 82 is attached to the bottom of internal support legs 80. At the top of support legs 80 is steel ring 14.

Figure 18:
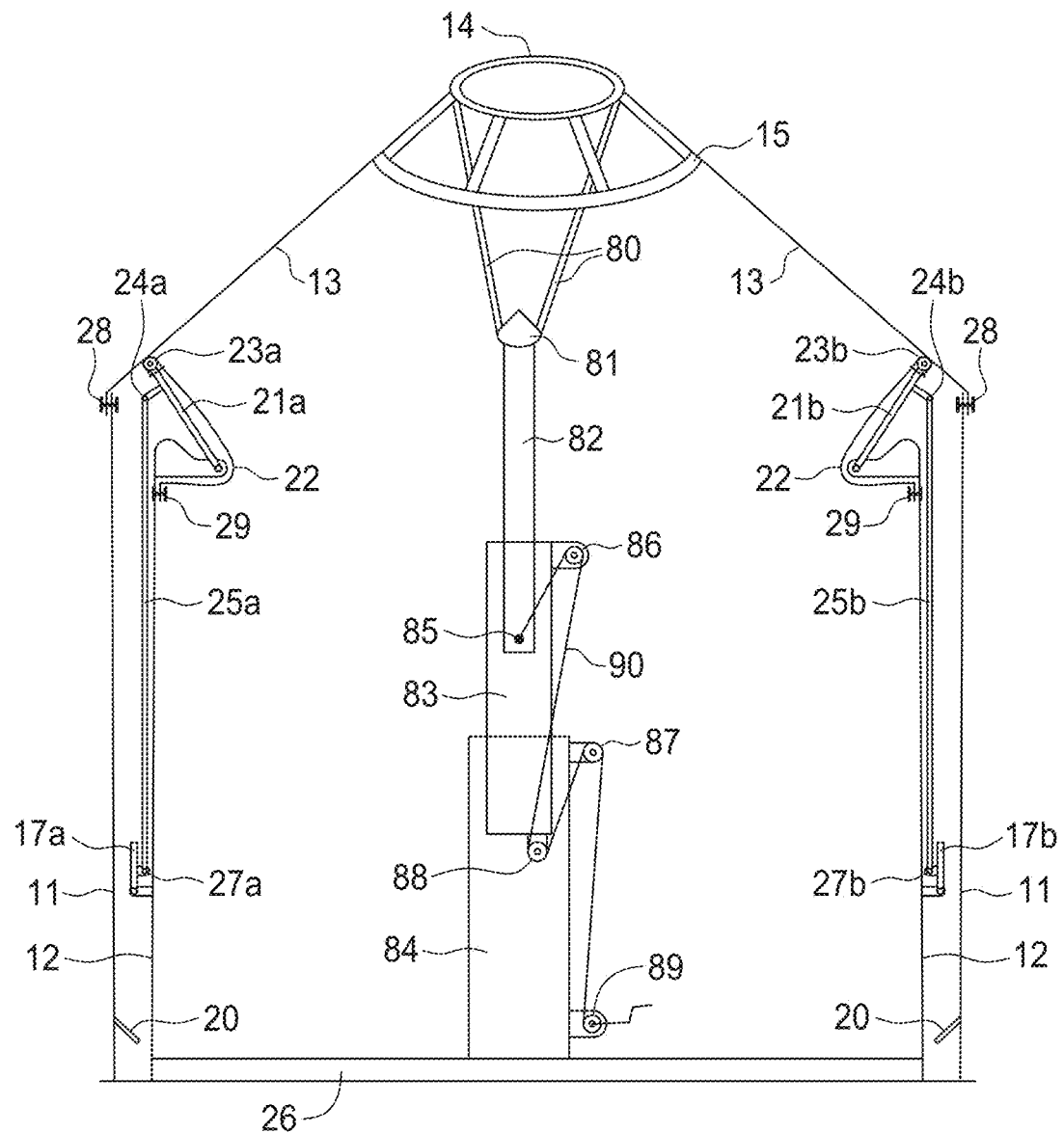
Figure 19:
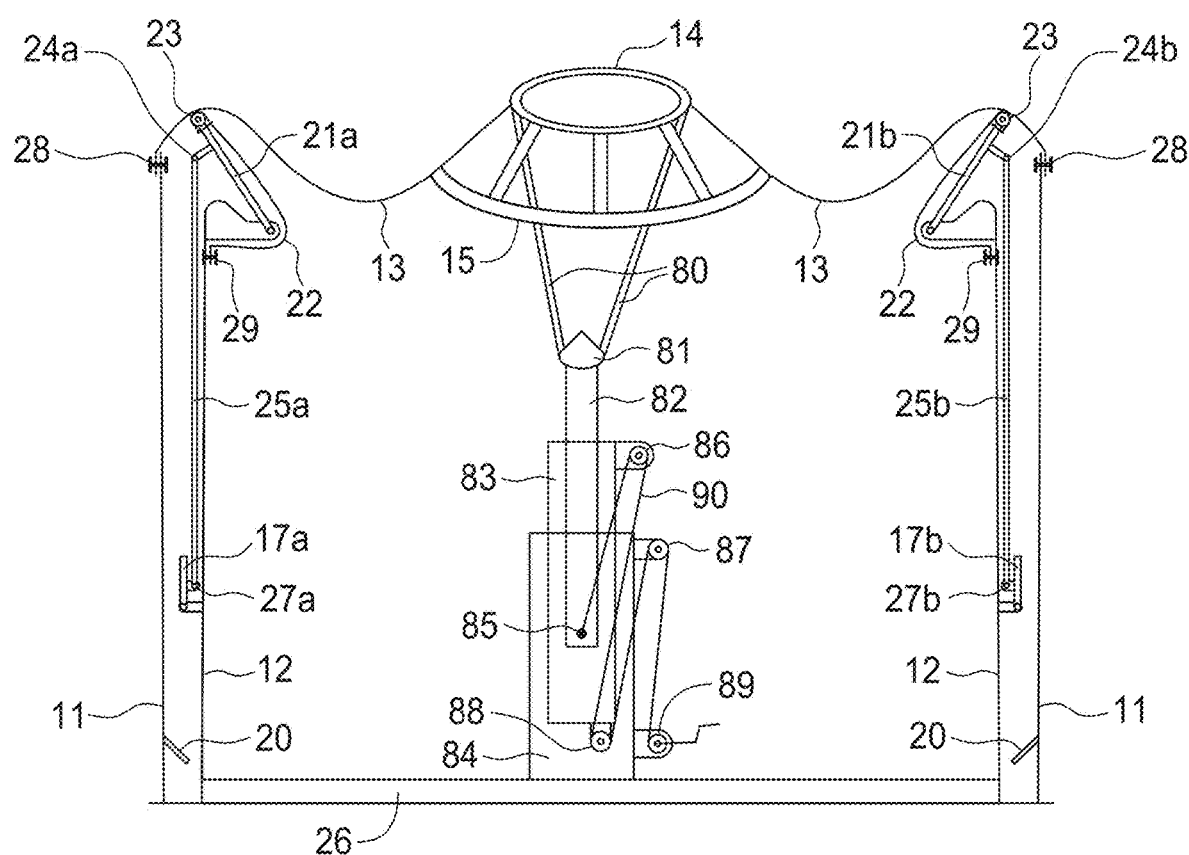

FIG. 18 shows the lifting mechanism of FIG. 17 in the storage position and FIG. 19 shows the lifting mechanism in transport position.

Figure 20A:
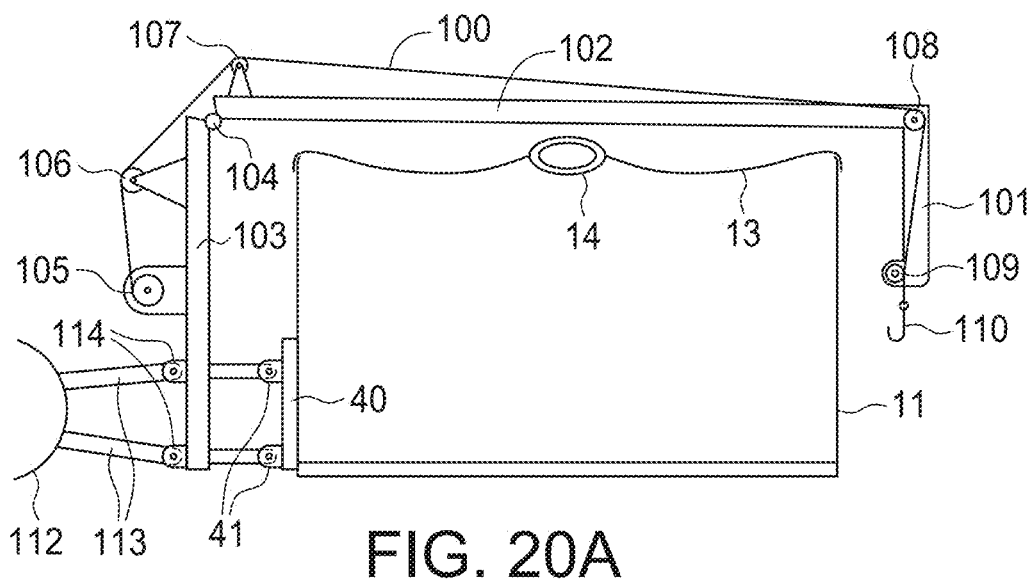
FIG. 20A shows an attached crane lifting mechanism with a three point hitch attachment attached to a grain bin of the present invention that is in the collapsed or transport position.
Figure 20B:
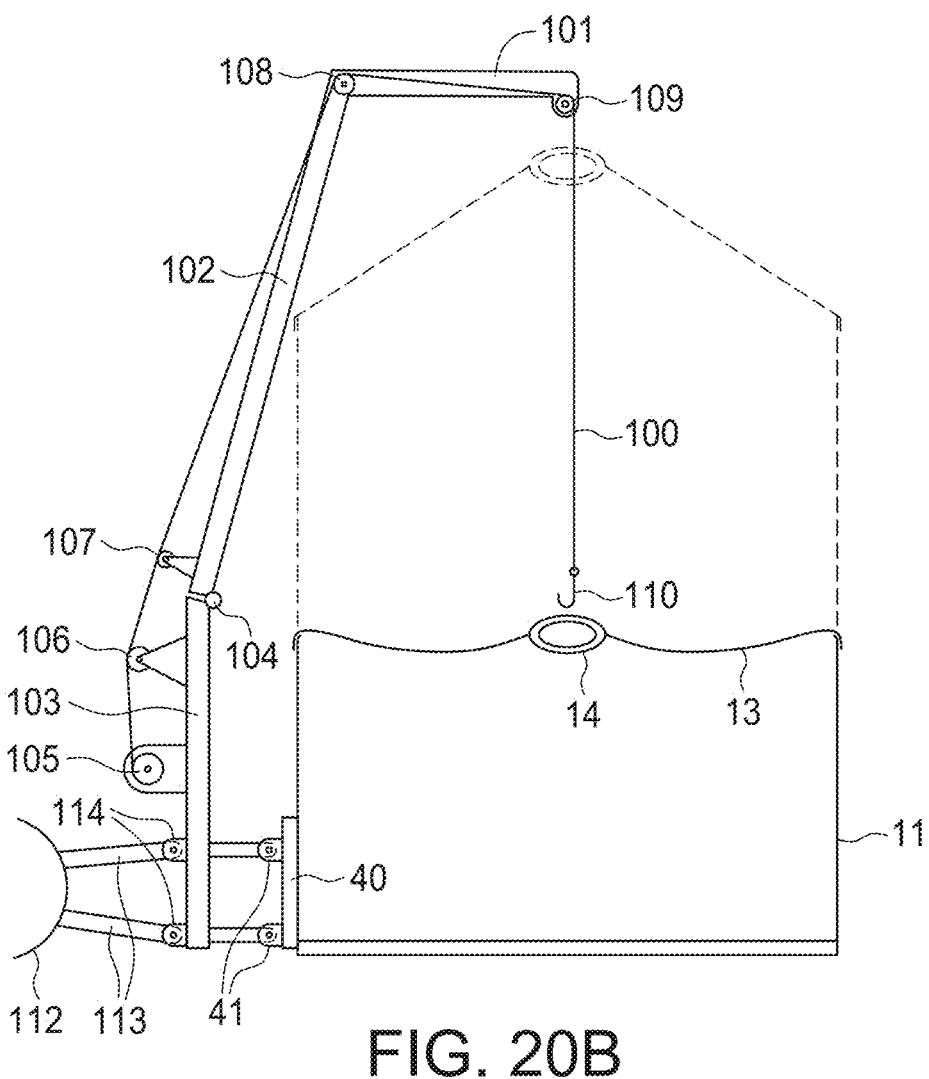
FIG. 20B shows the crane lifting mechanism of FIG. 20A in the expanded or working position.

FIGS. 20A and B show an attached bin crane that can be folded into transport position via hinge point 104 and lifted working position via winch 105 and cable 100. To accommodate the hinge point 104, cable guide stands 106 and 107 are required to guide the cable past the hinge point. With hinge point 104 locked into place, the winch can then be used to lift the bin to and from storage, transport or working position. This crane could be detached from the bin by removing pins from the three point hitch attachments 41. Then, the vehicle 112 and crane can be used to move another bins. The crane could also be left with the bin by removing three point hitch pins 114 from vehicle 112.

Figure 21:
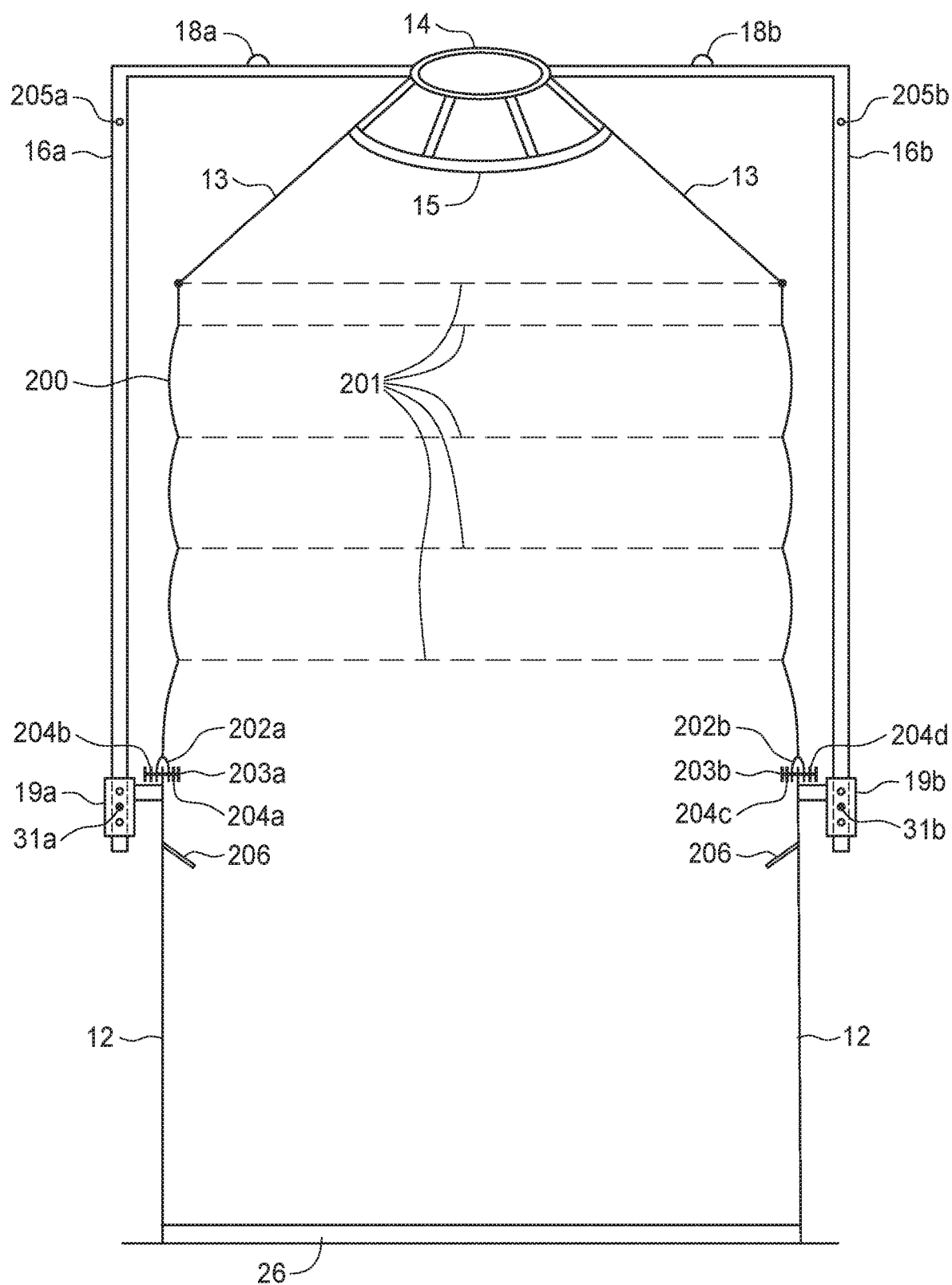
FIG. 21 is a perspective view of another embodiment of the present invention comprising a steel bottom section and a flexible material upper section with steel rings woven into the flexible material for support.

FIG. 21 shows an embodiment comprising a non-flexible lower bin section 12 having a larger diameter than the flexible upper bin section 200. Upper bin section 200 is made of flexible material such as a heavy tarp or the like. Woven into the tarp are steel rings (or similar material) 201. Upper bin section 200 is attached, e.g., by sewing, to roof tarp 13. Roof tarp 13 is attached to steel ring 14. When support poles 16 that are attached to steel ring 14 are lifted via hook receivers 18 and held into upper position via pins 31 in holder 19. The plurality of holes in polls 16 and holder 19 allow for adjustable tarp height and tension.

Flexible upper bin section 200 is attached to the upper end of lower bin section 12 via a "y" shape woven into the bottom of flexible upper bin section 200 to go on both the inside and outside of lower bin section 12. It is held in place via steel rings 204*a,b,c,d* on the inside and outside of lower bin section 12 and fasteners 203. This will seal the inside for grain and the outside for water.

Figure 22:
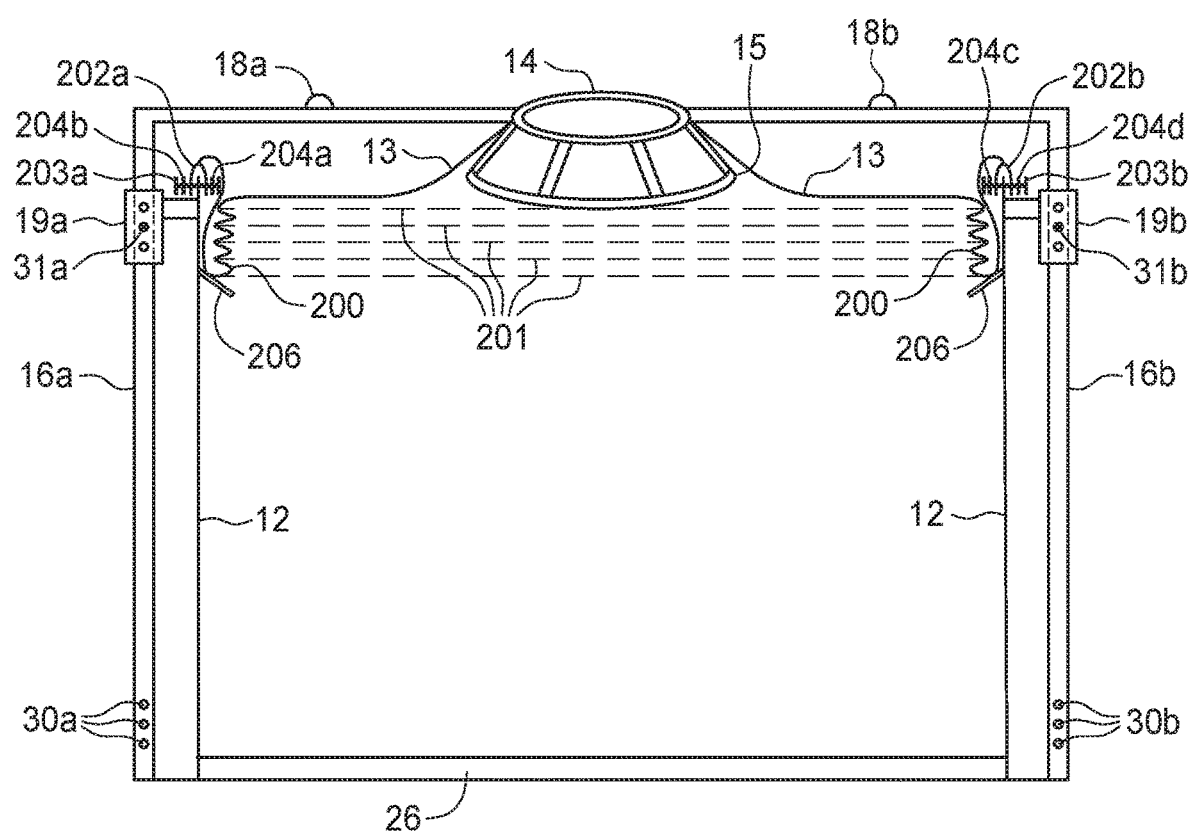
FIG. 22 shows the embodiment in 21 with the flexible material and woven steel rings collapsed into the bottom section for transport.

FIG. 22 shows this embodiment in the collapsed position where support poles 16 are lowered to transport position and pinned in 205 via pins 31. The flexible upper bin section 200 collapses inside lower bin section 12 guided by woven steel rings 201. Steel ring 206 is fastened to the inside of lower bin section 12 at a downward angle so as not to hold grain but still can support the tarp 200 and woven rings 201 when in transport position.

Figure 23:
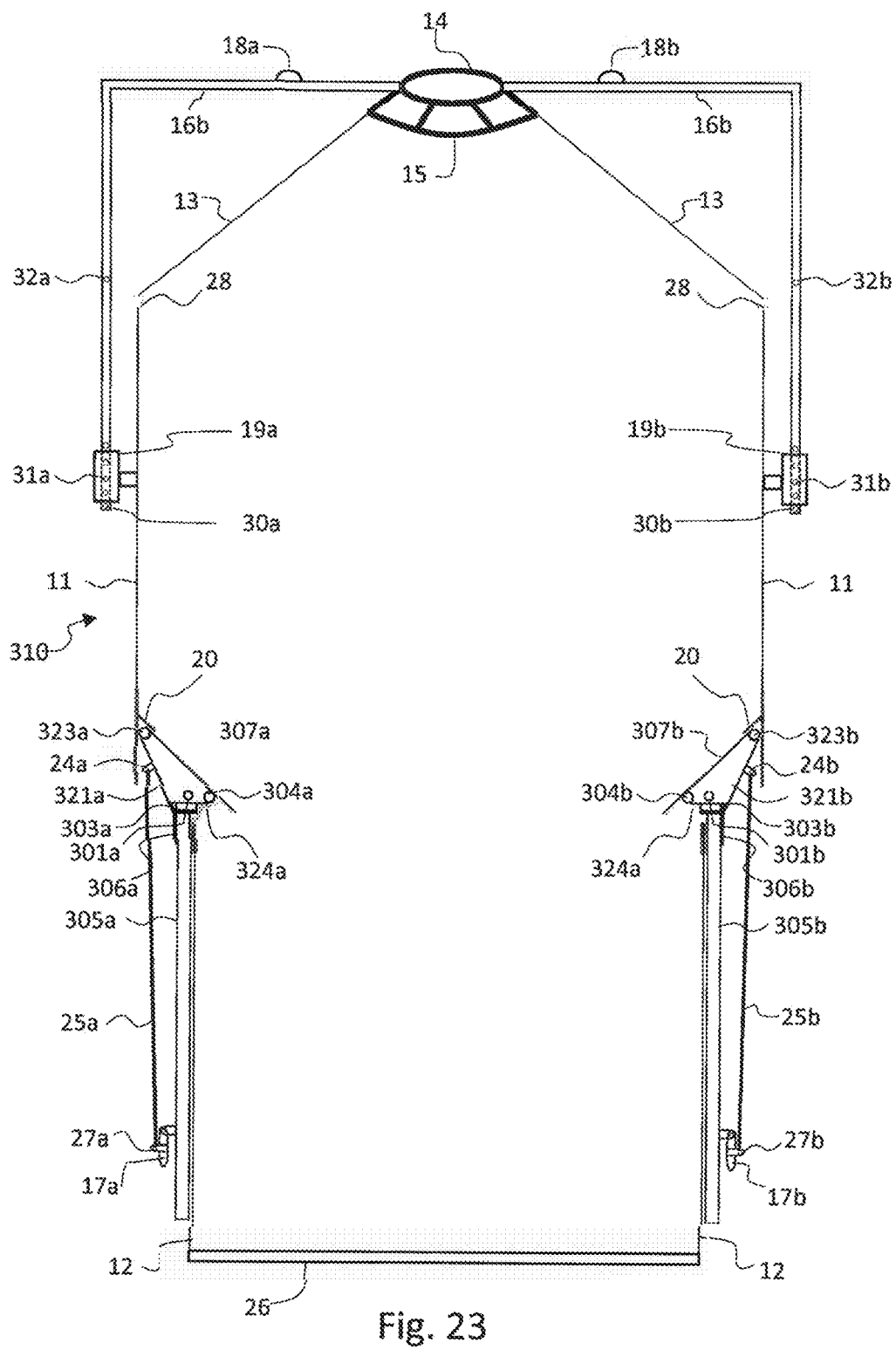
FIG. 23 is a cross-sectional view of another embodiment of the expandable and collapsible grain bin when in a fully expanded position ready to be filled with grain (working position).

FIG. 23 shows another embodiment of an expandable and collapsible grain bin 310 of the present invention in the fully expanded position, ready to be fill with grain. In this embodiment, as in FIG. 1, portable grain bin 10 comprises two telescoping cylindrical sections, upper bin section 11 and lower bin section 12. However, in this embodiment, the interlocking system is different. As in FIG. 1, the interlocking system still comprises steel ring 20, however, the supports members are different. In this embodiment, support members 321*a*, 321*b* are attached to the upper section of lower bin 12 via vertical support channels 305*a*, 305*b*, respectively, which channels are bolted to lower bin 12. In FIG. 23, only two support members and two vertical support channels are shown but it is understood that there can be any number of support members and vertical support members used in the present invention.

On top of each of channel 305*a* and 305*b* are attached L brackets 306*a*, 306*b*, and welded on top of 306*a*, 306*b* are bushing supports 303*a*, 303*b*. Support members 321*a*, 321*b* are pivotally attached via pins (not shown) via pivot holes 301*a* and 301*b*, respectively. Attached to the upper and lower end of the support members 321*a*, 321*b* are steel pipes 323*a*, 323*b* and steel pipes 304*a*, 304*b*. Pipes 323*a*, 323*b* and 304*a*, 304*b* are spaced apart enough to allow for each of them to move to a contracted position and expanded position without interference while providing continuous support for the sealing material. The embodiment shown in FIG. 23 could have a sealing member 307*a*, which could be a tarp attached to the pipes to provide the continuous seal (as described in the previous embodiments) or, in the alternative, a curved sheet of gauge metal material, stiff plastic and the like, which will be described in more detail below.

The interlocking system further comprises positioning rod 25*a*/25*b*. The upper end of positioning rod 25*a*/25*b* is attached to support member 321*a*/321*b*, respectively, at pivot point 24*a*/24*b*, respectively, and the lower end of rod 25*a*/25*b* is attached to leavers 17*a*/17*b* at pivot point 27*a*/27*b*, respectively, to move and hold support member 321*a*/321*b* in desired position. When lowering outer bin section 11 onto ring 20, support member 321*a*/321*b* can be held in position with a strap or the like (not shown).

Figure 24:
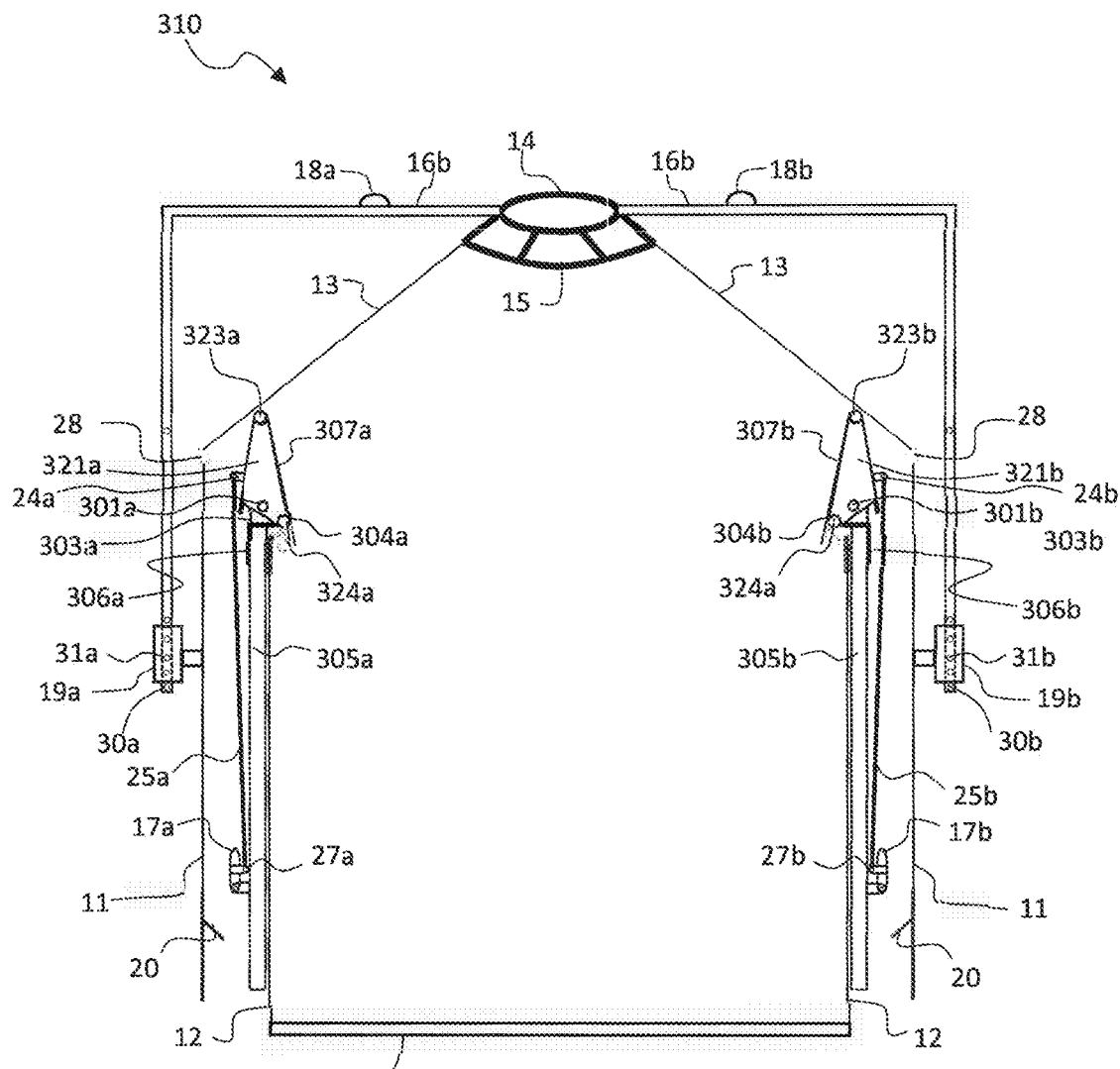
FIG. 24 is a cross-sectional view of the expandable and collapsible grain bin of FIG. 23 when in a partially collapsed position.

The first step in collapsing the extended portable grain bin 310 of FIG. 23 is shown in FIG. 24. In particular, to lower the bin 10 into transport position, a standard bin crane or the like can be used. In particular, a bin crane is attached to crane hook receivers 18*a*, 18*b*, to take pressure off the sealing members 321*a*, 321*b*. Once bin 10 is high enough that are clear of ring 20, the support members 321*a*, 321*b* can be pushed into the retracted position via positioning rods 25*a*, 25*b*, respectively, by moving leavers 17*a*, 17*b*, respectively, into the upward position as shown in FIG. 24. Leavers 17*a*, 17*b* can again be held in position by a strap or the like (not shown). The bin crane can be lowered until upper bin section 11 rests on the steel base 26. The device could be stored in this position with the roof up as shown in FIG. 24.

To get ready for transport, with the bin crane still attached to crane hook receivers 18, the next step is to remove pins 31 from roof support poles 16 and holder 19. The roof support structure is further lowered until holes 32*a*. 32*b* are aligned with a hole in roof holders 19, as shown in FIG. 25.

Figure 25:
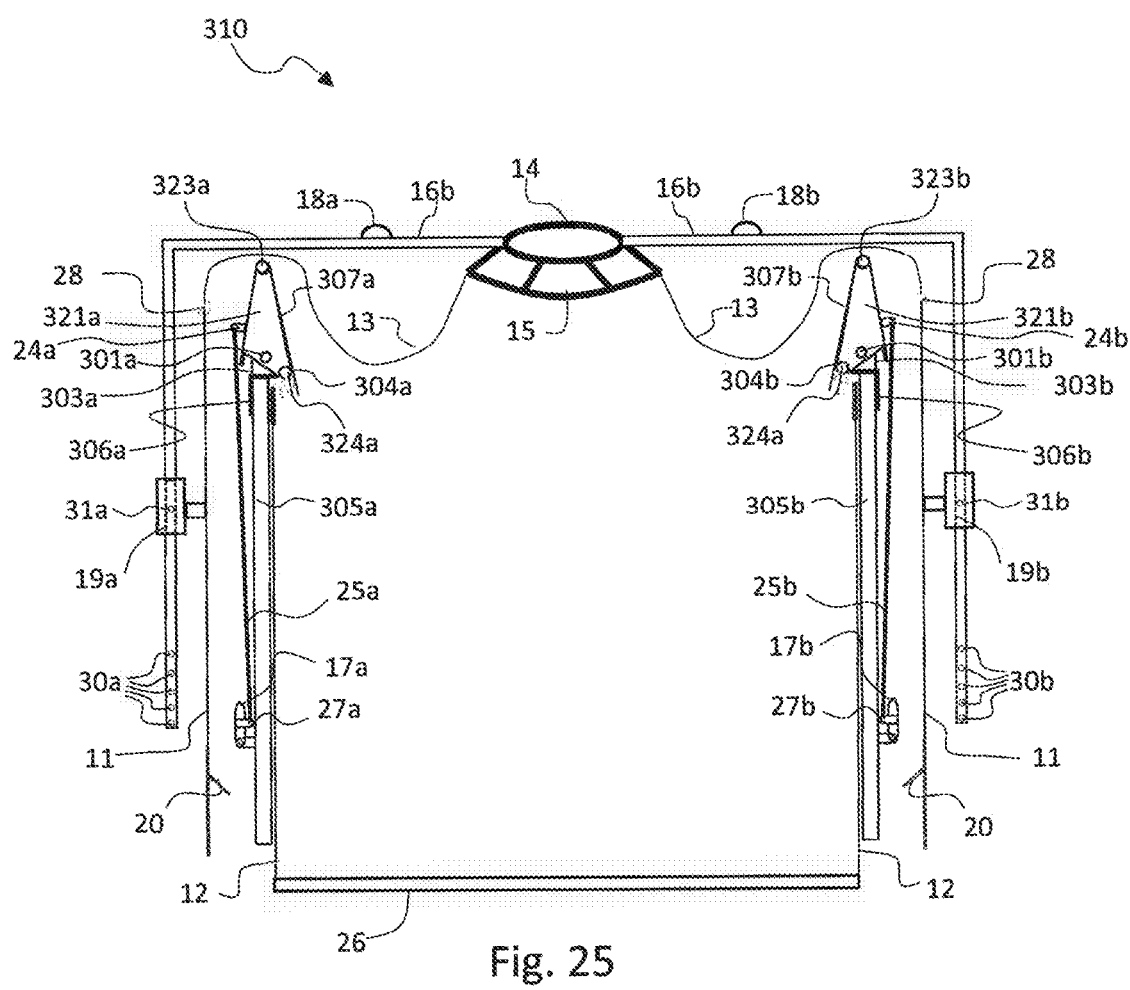
FIG. 25 is a cross-sectional view of the expandable and collapsible grain bin of FIG. 23 when in a fully collapsed position (transport position).
Figure 26:
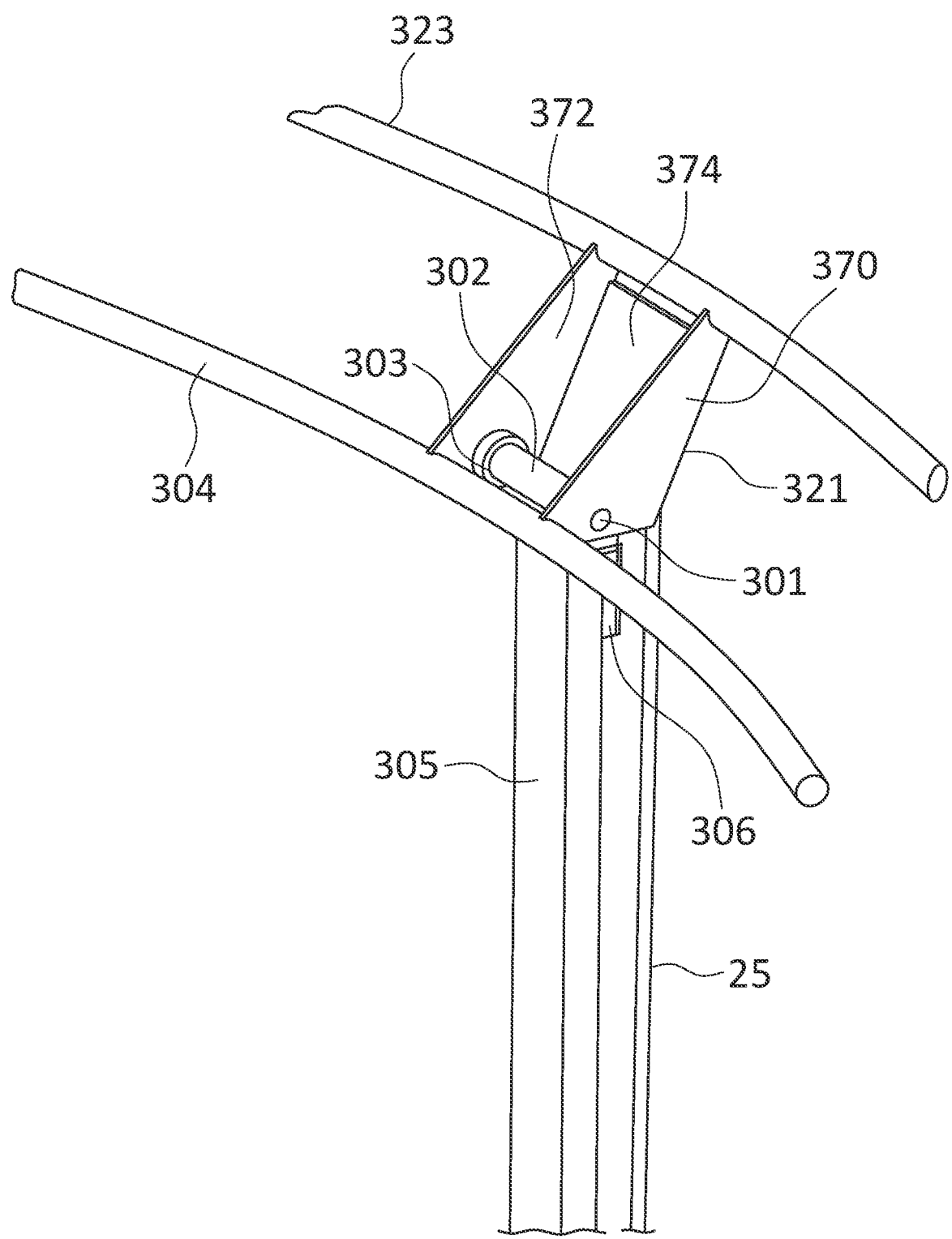
FIG. 26 is a perspective view of the front of one support member shown in FIGS. 23, 24 and 25 in the working position.

FIG. 26 is a perspective view of the front of one support member 321 shown in FIGS. 23, 24 and 25 in the working position. As can be seen in FIG. 26, support member 321 is triangular in shape and comprises two side walls 370, 372 and a back wall 374. Inserted through the bottom is bushing 302 comprising pivot hole 301. Support member 321 is able to pivot into a working position or in a transport position by means of bushing 302 and bushing supports, which are welded to L bracket 306 and positioned in between the two side walls 370, 372. A pivot pin (not shown) is inserted into pivot hole 301, which pivotally attaches support member 321 to L bracket 306. L bracket, in turn, is attached to vertical support channel 305, which, in turn, is bolted to lower bin 12.

Attached to the upper and lower ends of side walls 370, 372 curved pipes 323 and 304, respectively, which can be made of any suitable material, including steel. The curved pipes are spaced apart enough to allow for them to move to a contracted position and expanded position without interference while providing continuous support for a sealing material such as a tarp or other material.

Figure 27:
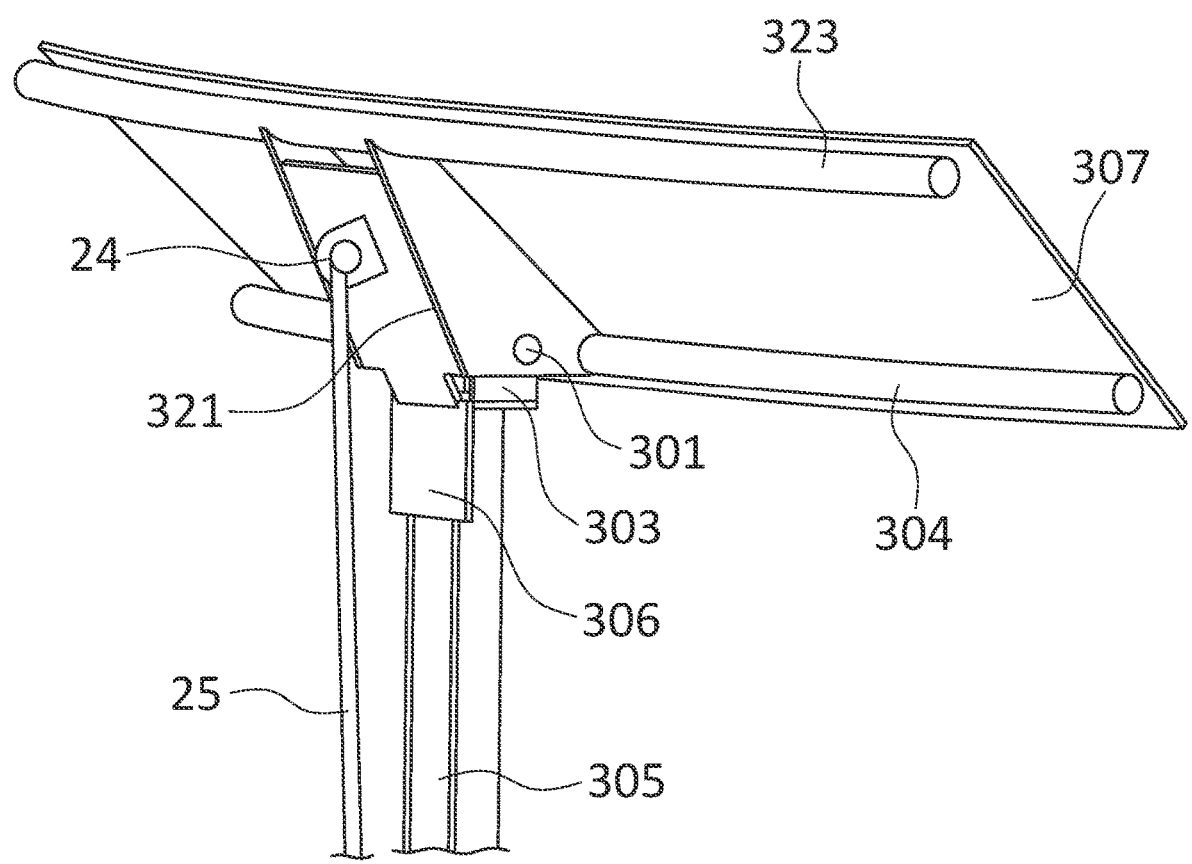
FIG. 27 is a perspective view of the back of support member of FIG. 26.
Figure 28:
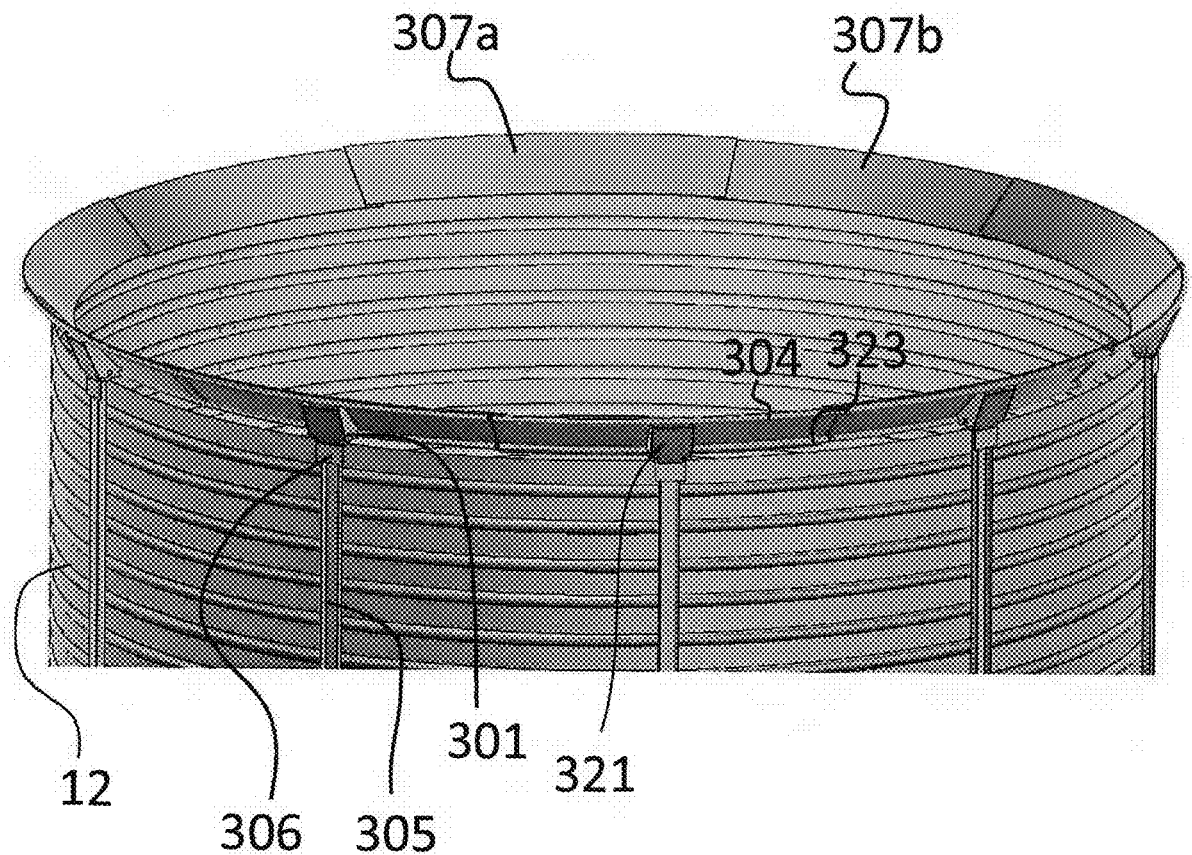
FIG. 28 is a perspective view of the lower bin of FIG. 23.

FIG. 27 is a perspective view of the back of support member 321 of FIG. 26. It can be seen that the upper end of positioning rod 25 is attached to back wall 374 of support member 321 at pivot point 24. In this embodiment, attached to the front of the curved pipes 323 and 304 is a curved sheet 307 made of a material such as gauge metal material, stiff plastic or the like, that is stiff enough to support the grain when full but flexible enough to conform to the curve of the pipes in order to follow the circumference of the bin when attached. This can be seen more clearly in FIG. 28, which is a perspective of the lower bin 12 of FIG. 23. With reference to FIG. 28, in order to seal between curved sheets 307, every second sheet (curved sheet 307a) could have a width narrow enough to miss the curved pipes adjacent to it when in the retracted position (approximately the same width as the pipes) and every second piece of sheet would have a width wide enough to overlap curved sheet 307b creating a seal. This allows the support arms to contract and expand creating a continuous seal. It is understood, however, that curved sheets 307, 307a can be directly attached to the front edges of side walls 370, 372 by welding and the like, thereby eliminating the need for curved pipes 323 and 304.

Figure 29:
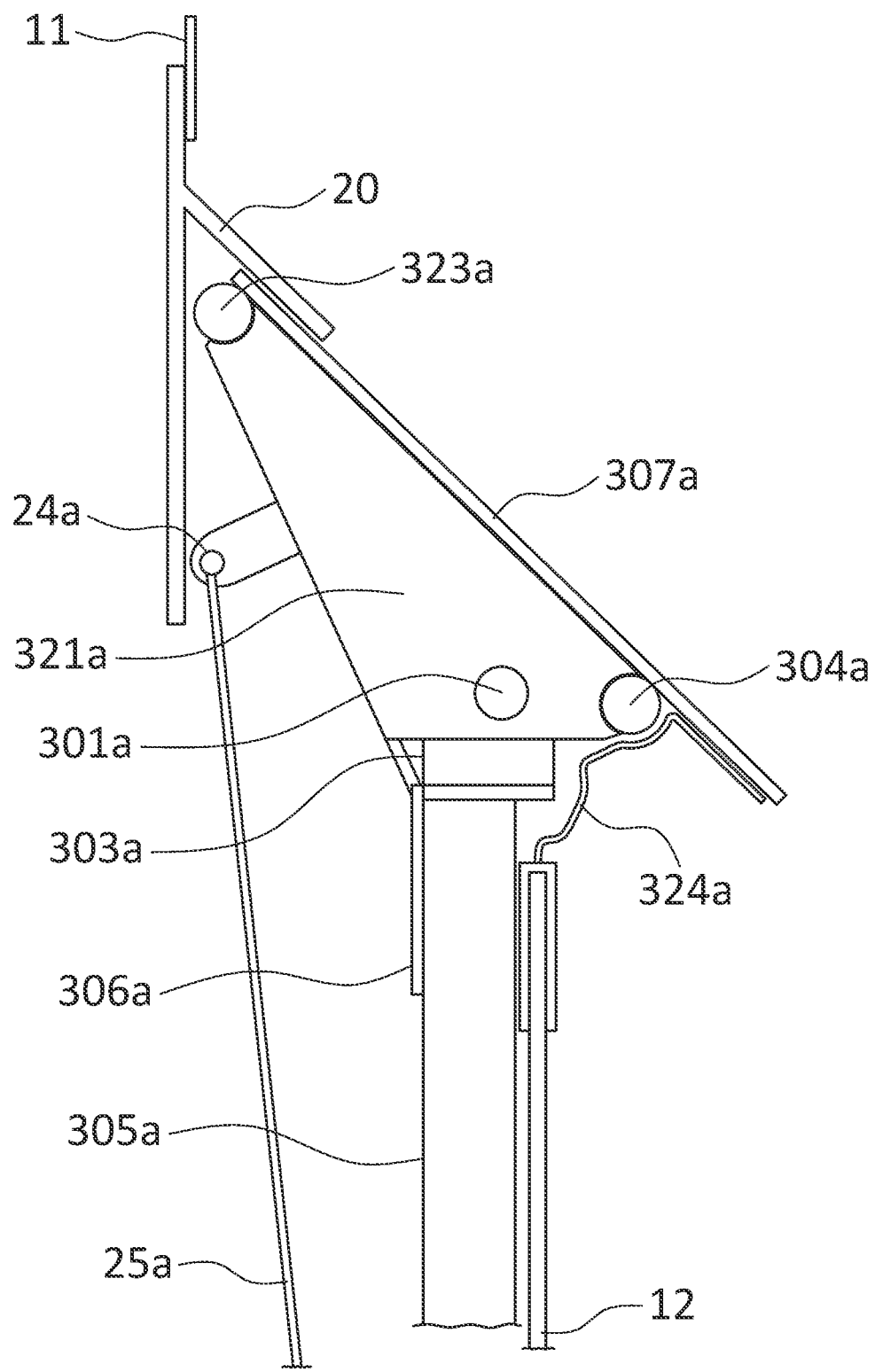
FIG. 29 is a cross-section of one of the interlocking systems of FIG. 23.

FIG. 29 is a cross-section of one of the interlocking systems of FIG. 23. In one embodiment, an additional seal can be added to provide additional protection from grain and the like from leaking from the expandable and collapsible grain bin 310. Tarp 324a can be secured around the upper lip of lower bin 12 and on the lower portion of seal 307a.

Figure 30:
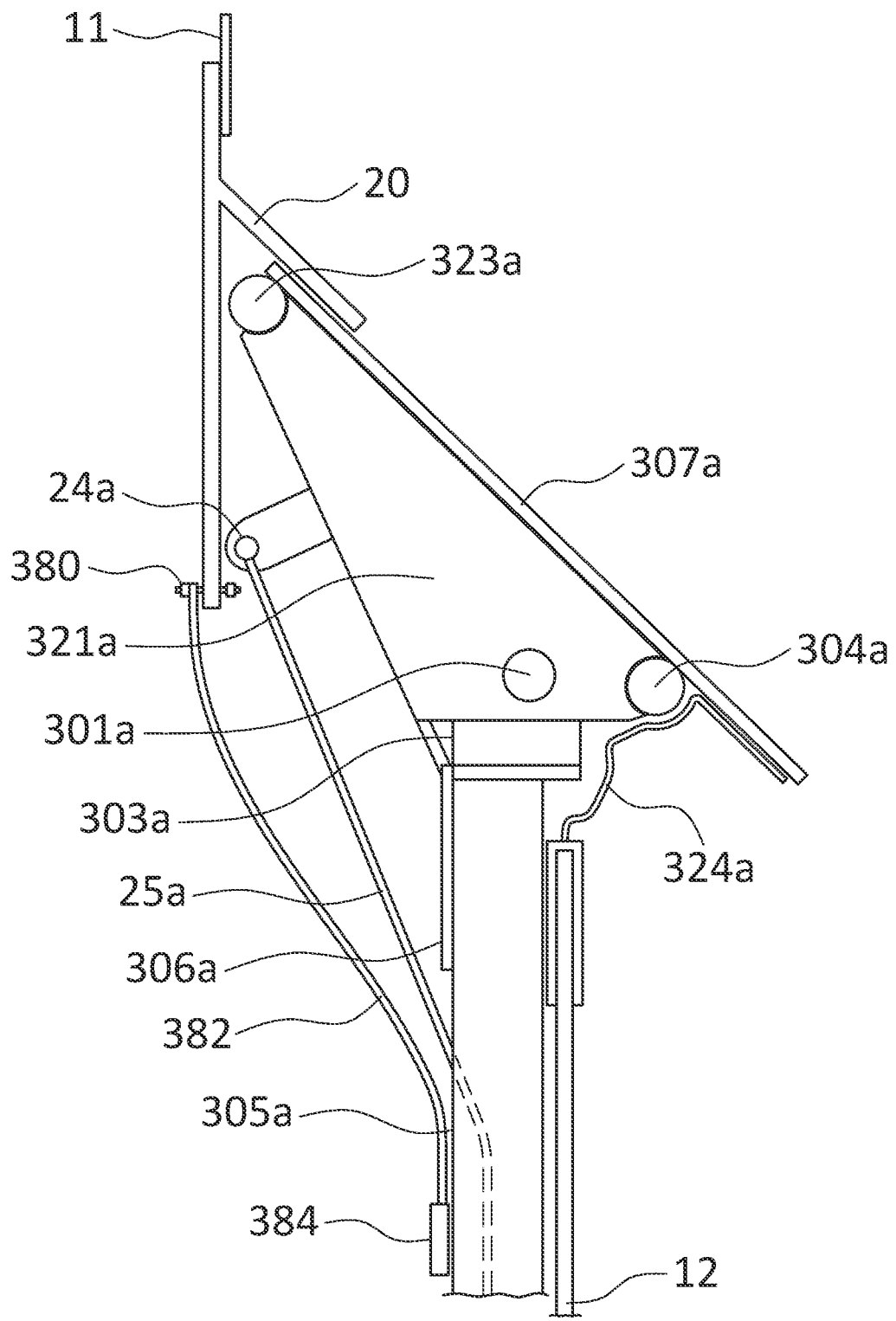
FIG. 30 is a cross-section of one of the interlocking systems of FIG. 23 showing a second tarp ring attached to the outside of the upper bin of the portable grain bin.

In one embodiment, it may be necessary to add a second tarp ring 382 attached to the outside of upper bin 11 via attachment 380 and draping down the side of lower bin 12 to stop rain and snow from blowing up into the bin, as shown in FIG. 30. The additional tarp would also stop birds from nesting in the space between the rings. A woven in tightening strap 384 would provide a seal against the outside of the bin. Tightening strap 384 can be loosened when the bin is lowered into transport position. In one embodiment, the adjusting rods 25 are curved to get a better seal.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A grain bin, comprising:
    at least two telescoping cylindrical sections, each cylindrical section adapted to interlock with an adjacent cylindrical section by means of an interlocking device such that the at least two telescoping cylindrical sections are automatically and reversibly locked into place relative to one another when in a freestanding expanded position and automatically unlocked from one another when in a collapsed position;
    a base member attached to the bottom most cylindrical section; and
    a bin cover for enclosing the grain bin, said bin cover adapted to be in a raised position when the grain bin is in a working position and in a lowered position when the grain bin is in a transport position.

2. The grain bin as claimed in claim 1, the grain bin comprising two telescoping cylindrical sections, a top section and a bottom section, the top section having an inner diameter that is larger than the outer diameter of the bottom section.

3. The grain bin as claimed in claim 2, wherein the base member has an outer support that is larger than the outer diameter of the top section so that when the two telescoping cylindrical sections are in the collapsed position the top section can rest on the outer support.

4. The grain bin as claimed in claim 2, wherein the base member comprises an outer support that is larger than the outer diameter of the top section so that when the two telescoping cylindrical sections are in the collapsed position the top section can rest on the outer support.

5. The grain bin as claimed in claim 2, wherein the interlocking device comprises a steel ring on the inside of the top section at or near its bottom and a plurality of support members attached to the bottom section at or near its top.

6. The grain bin as claimed in claim 5, wherein the support members comprises support arms and the interlocking device further comprises a tarp wrapped around the support arms to provide a seal between each section.

7. The grain bin as claimed in claim 5, further comprising a curved member connected to the support members for carrying a sealing material to provide a seal between each section.

8. The grain bin as claimed in claim 7, whereby the curved member is adapted to expand and contract to create a continuous seal between the support members when in the expanded position.

9. The grain bin as claimed in claim 8, wherein the sealing material comprises a tarp or a plurality of curved sheets.

10. The grain bin as claimed in claim 9, wherein the plurality of curved sheets are made of a gauge metal material or stiff plastic.

11. The grain bin as claimed in claim 7, wherein the curved member comprises at least one curved pipe.

12. The grain bin as claimed in claim 7, wherein the curved member comprises a plurality of overlapping curved sheets.

13. The grain bin as claimed in claim 5, wherein each support member is pivotally attached to the bottom section at or near its top by means of a pivot pin so that each support member can pivot from an engaged position to a disengaged position.

14. The grain bin as claimed in claim 13, further comprising a plurality of positioning rods, each positioning rod pivotally attached to each support member for positioning each support member into either the engaged position or the disengaged position.

15. The grain bin as claimed in claim 1, the grain bin comprising two telescoping cylindrical sections, a top section and a bottom section, the top section having an outer diameter that is smaller than the inner diameter of the bottom section.

16. The grain bin as claimed in claim 15, wherein the interlocking device comprises a steel ring on the outside of the upper section at or near its bottom and a plurality of support members to the bottom section at or near its top.

17. The grain bin as claimed in claim 16, wherein the support members comprises support arms and the interlocking device further comprises a tarp wrapped around the support arms to provide a seal between each section.

18. The grain bin as claimed in claim 16, further comprising a curved member connected to the support members for carrying a sealing material to provide a seal between each section.

19. The grain bin as claimed in claim 18, whereby the curved member is adapted to expand and contract to create a continuous seal between the support members when in the expanded position.

20. The grain bin as claimed in claim 19, wherein the sealing material comprises a tarp or a plurality of curved sheets.

21. The grain bin as claimed in claim 20, wherein the plurality of curved sheets are made of a gauge metal material or stiff plastic.

22. The grain bin as claimed in claim 18, wherein the curved member comprises at least one curved pipe.

23. The grain bin as claimed in claim 1, further comprising a lifting plate attached to the base member for transporting the grain bin when the at least two telescoping cylindrical sections are in the collapsed position.

24. The grain bin as claimed in claim 1, wherein the grain bin comprises a non-flexible bottom section and a flexible upper section, whereby the flexible upper section collapses into the non-flexible bottom section when in the collapsed position.

25. The grain bin as claimed in claim 24, wherein the flexible upper section comprises a flexible tarp-like material having steel rings woven into the flexible material, said steel rings having a smaller outer diameter than the inner diameter of the bottom section.

* * * * *